US012664656B2

(12) United States Patent
Jing et al.

(10) Patent No.: US 12,664,656 B2
(45) Date of Patent: Jun. 23, 2026

(54) CORRELATING REGIONS OF INTEREST

(71) Applicant: HOLOGIC, INC., Marlborough, MA (US)

(72) Inventors: Zhenxue Jing, Marlborough, MA (US); Shawn St. Pierre, Marlborough, MA (US)

(73) Assignee: Hologic, Inc., Marlborough, MA (US)

( * ) Notice: Subject to any disclaimer, the term of this patent is extended or adjusted under 35 U.S.C. 154(b) by 392 days.

(21) Appl. No.: 18/245,149

(22) PCT Filed: Aug. 26, 2021

(86) PCT No.: PCT/US2021/047788
§ 371 (c)(1),
(2) Date: Mar. 13, 2023

(87) PCT Pub. No.: WO2022/060522
PCT Pub. Date: Mar. 24, 2022

(65) Prior Publication Data
US 2023/0351600 A1 Nov. 2, 2023

Related U.S. Application Data

(60) Provisional application No. 63/080,193, filed on Sep. 18, 2020.

(51) Int. Cl.
G06K 9/00 (2022.01)
G06T 7/00 (2017.01)

(52) U.S. Cl.
CPC ........ G06T 7/0016 (2013.01); G06T 2200/24 (2013.01); G06T 2207/10112 (2013.01);
(Continued)

(58) Field of Classification Search
CPC ............... G06T 7/0016; G06T 2200/24; G06T 2207/10112; G06T 2207/10116;
(Continued)

(56) References Cited

U.S. PATENT DOCUMENTS 3,908,293 A 9/1975 Newman
3,971,950 A 7/1976 Evans
(Continued)

FOREIGN PATENT DOCUMENTS

CN 1640209 A 7/2005
CN 1853573 11/2006
(Continued)

OTHER PUBLICATIONS

Yuan Y, Giger ML, Li H, Sennett C. Correlative feature analysis on FFDM. Med Phys. Dec. 2008;35(12):5490-500. doi: 10.1118/1. 3005641. PMID: 19175108; PMCID: PMC2736721. (Year: 2008).*
(Continued)

*Primary Examiner* — Atiba O Fitzpatrick
(74) *Attorney, Agent, or Firm* — Merchant & Gould P.C.

(57) ABSTRACT

Methods and systems for identifying a region of interest in breast tissue use artificial intelligence to confirm that a target lesion identified during initial imaging the breast tissue has been identified in a subsequent imaging session. A computing system operating a lesion matching engine uses a machine learning classifier algorithm trained on cases of initial and subsequent two-dimensional or three-dimensional images of lesions. The lesion matching engine analyzes a target lesion identified with initial and a potential lesion identified with current imaging to determine a likelihood that the target lesion is the same as the potential lesion. A confidence level indicator for the lesion match is presented on a display of a computing device to aid a healthcare provider in locating a lesion in breast tissue.

20 Claims, 10 Drawing Sheets

(52) U.S. Cl.
CPC .............. *G06T 2207/10116* (2013.01); *G06T 2207/20081* (2013.01); *G06T 2207/30068* (2013.01); *G06T 2207/30096* (2013.01)

(58) Field of Classification Search
CPC . G06T 2207/20081; G06T 2207/30068; G06T 2207/30096; G06T 2207/20076; G06T 7/33
See application file for complete search history.

(56) References Cited

U.S. PATENT DOCUMENTS

| | | |
|---|---|---|
| 4,821,727 A | 4/1989 | Levene et al. |
| 4,907,156 A | 3/1990 | Doi et al. |
| 5,078,142 A | 1/1992 | Siczek et al. |
| 5,129,911 A | 7/1992 | Siczek et al. |
| 5,133,020 A | 7/1992 | Giger et al. |
| 5,219,351 A | 6/1993 | Teubner |
| 5,220,867 A | 6/1993 | Carpenter |
| 5,240,011 A | 8/1993 | Assa |
| 5,280,427 A | 1/1994 | Magnusson |
| 5,289,374 A | 2/1994 | Doi |
| 5,289,520 A | 2/1994 | Pellegrino et al. |
| 5,343,390 A | 8/1994 | Doi et al. |
| 5,386,447 A | 1/1995 | Siczek |
| 5,415,169 A | 5/1995 | Siczek et al. |
| 5,426,685 A | 6/1995 | Pellegrino et al. |
| 5,452,367 A | 9/1995 | Bick |
| 5,474,072 A | 12/1995 | Schmulewitz |
| 5,479,603 A | 12/1995 | Stone |
| 5,491,627 A | 2/1996 | Zhang et al. |
| 5,495,576 A | 2/1996 | Ritchey |
| 5,537,485 A | 7/1996 | Nishikawa |
| 5,594,769 A | 1/1997 | Pellegrino et al. |
| 5,609,152 A | 3/1997 | Pellegrino et al. |
| 5,657,362 A | 8/1997 | Giger |
| 5,729,471 A | 3/1998 | Jain |
| 5,735,264 A | 4/1998 | Siczek et al. |
| 5,769,086 A | 6/1998 | Ritchart et al. |
| 5,773,832 A | 6/1998 | Sayed et al. |
| 5,803,912 A | 9/1998 | Siczek et al. |
| 5,851,180 A | 12/1998 | Crosby |
| 5,872,828 A | 2/1999 | Niklason et al. |
| 5,999,662 A | 12/1999 | Burt |
| 6,022,325 A | 2/2000 | Siczek et al. |
| 6,044,181 A | 3/2000 | Szeliski et al. |
| 6,075,905 A | 6/2000 | Herman et al. |
| 6,101,236 A | 8/2000 | Wang et al. |
| 6,102,866 A | 8/2000 | Nields et al. |
| 6,104,840 A | 8/2000 | Ejiri et al. |
| 6,198,838 B1 | 3/2001 | Roehrig |
| 6,245,028 B1 | 6/2001 | Furst et al. |
| 6,249,616 B1 | 6/2001 | Hashimoto |
| 6,263,092 B1 | 7/2001 | Roehrig |
| 6,293,282 B1 | 9/2001 | Lemelson |
| 6,349,153 B1 | 2/2002 | Teo |
| 6,359,617 B1 | 3/2002 | Xiong |
| 6,459,925 B1 | 10/2002 | Nields et al. |
| 6,468,226 B1 | 10/2002 | McIntyre, IV |
| 6,480,565 B1 | 11/2002 | Ning |
| 6,620,111 B2 | 9/2003 | Stephens et al. |
| 6,626,849 B2 | 9/2003 | Huitema et al. |
| 6,638,235 B2 | 10/2003 | Miller et al. |
| 6,683,934 B1 | 1/2004 | Zhao |
| 6,725,095 B2 | 4/2004 | Fenn |
| 6,758,824 B1 | 7/2004 | Miller et al. |
| 6,987,331 B2 | 1/2006 | Koeppe |
| 7,054,473 B1 | 5/2006 | Roehrig |
| 7,123,684 B2 | 10/2006 | Jing et al. |
| 7,134,080 B2 | 11/2006 | Kjeldsen |
| 7,174,039 B2 | 2/2007 | Koo |
| 7,184,582 B2 | 2/2007 | Giger et al. |
| 7,245,694 B2 | 7/2007 | Jing et al. |
| 7,466,795 B2 | 12/2008 | Eberhard et al. |
| 7,489,761 B2 | 2/2009 | DeFreitas |
| 7,505,555 B2 | 3/2009 | Hermann |
| 7,577,282 B2 | 8/2009 | Gkanatsios et al. |
| 7,606,801 B2 | 10/2009 | Faitelson et al. |
| 7,616,801 B2 | 11/2009 | Gkanatsios et al. |
| 7,634,050 B2 | 12/2009 | Muller et al. |
| 7,697,660 B2 | 4/2010 | Ning |
| 7,702,142 B2 | 4/2010 | Ren et al. |
| 7,731,662 B2 | 6/2010 | Anderson et al. |
| 7,760,924 B2 | 7/2010 | Ruth et al. |
| 7,787,936 B2 | 8/2010 | Kressy |
| 7,831,296 B2 | 11/2010 | DeFreitas et al. |
| 7,869,563 B2 | 1/2011 | DeFreitas |
| 7,889,896 B2 | 2/2011 | Roehrig |
| 7,991,106 B2 | 8/2011 | Ren et al. |
| 8,160,677 B2 | 4/2012 | Gielen et al. |
| 8,192,361 B2 | 6/2012 | Sendai |
| 8,465,413 B2 | 6/2013 | Deitch |
| 8,532,745 B2 | 9/2013 | DeFreitas et al. |
| 8,594,274 B2 | 11/2013 | Hoernig et al. |
| 8,942,342 B2 | 1/2015 | Abenaim |
| 8,995,740 B2 | 3/2015 | Santamaria-Pang |
| 9,019,262 B2 | 4/2015 | Ma |
| 9,020,579 B2 | 4/2015 | Smith |
| 9,160,793 B2 | 10/2015 | Base et al. |
| 9,901,309 B2 | 2/2018 | DeFreitas et al. |
| 9,901,320 B2 | 2/2018 | DeFreitas et al. |
| 10,037,601 B1 | 7/2018 | Ben-Ari |
| 10,092,358 B2 | 10/2018 | DeFreitas |
| 10,335,094 B2 | 7/2019 | DeFreitas |
| 10,357,211 B2 | 7/2019 | Smith |
| 10,456,213 B2 | 10/2019 | DeFreitas |
| 10,595,954 B2 | 3/2020 | DeFreitas |
| 10,733,566 B1 | 8/2020 | Chan |
| 10,956,701 B2 | 3/2021 | Laviola |
| 11,126,649 B2 | 9/2021 | Eswaran et al. |
| 11,379,516 B2 | 7/2022 | Peng et al. |
| 11,462,311 B2 | 10/2022 | Chan |
| 11,853,401 B1 | 12/2023 | Nookula |
| 11,883,206 B2 | 1/2024 | Chen |
| 12,183,001 B2 | 12/2024 | Golden |
| 2001/0038681 A1 | 11/2001 | Stanton et al. |
| 2001/0044578 A1 | 11/2001 | Ben-Haim et al. |
| 2002/0113681 A1 | 8/2002 | Byram |
| 2002/0122533 A1 | 9/2002 | Marie et al. |
| 2003/0007598 A1 | 1/2003 | Wang et al. |
| 2003/0018272 A1 | 1/2003 | Treado et al. |
| 2003/0055471 A1 | 3/2003 | Fenn et al. |
| 2003/0073895 A1 | 4/2003 | Nields et al. |
| 2003/0135115 A1 | 7/2003 | Burdette et al. |
| 2003/0194050 A1 | 10/2003 | Eberhard et al. |
| 2004/0077938 A1 | 4/2004 | Mark et al. |
| 2004/0077944 A1 | 4/2004 | Steinberg |
| 2004/0081273 A1 | 4/2004 | Ning |
| 2004/0101095 A1 | 5/2004 | Jing |
| 2004/0127789 A1 | 7/2004 | Ogawa |
| 2004/0171933 A1 | 9/2004 | Stoller et al. |
| 2004/0171986 A1 | 9/2004 | Tremaglio, Jr. et al. |
| 2004/0267157 A1 | 12/2004 | Miller et al. |
| 2005/0020903 A1 | 1/2005 | Krishnan et al. |
| 2005/0049497 A1 | 3/2005 | Krishnan et al. |
| 2005/0049521 A1 | 3/2005 | Miller et al. |
| 2005/0084060 A1 | 4/2005 | Seppi et al. |
| 2005/0089205 A1 | 4/2005 | Kapur |
| 2005/0108643 A1 | 5/2005 | Schybergson |
| 2005/0111718 A1 | 5/2005 | MacMahon |
| 2005/0113681 A1 | 5/2005 | DeFreitas et al. |
| 2005/0113715 A1 | 5/2005 | Schwindt et al. |
| 2005/0124845 A1 | 6/2005 | Thomadsen et al. |
| 2006/0004278 A1* | 1/2006 | Giger ...................... G06T 7/35 600/408 |
| 2006/0009693 A1 | 1/2006 | Hanover et al. |
| 2006/0025680 A1 | 2/2006 | Jeune-Lomme |
| 2006/0030784 A1 | 2/2006 | Miller et al. |
| 2006/0074287 A1 | 4/2006 | Neumann |
| 2006/0098855 A1 | 5/2006 | Gkanatsios et al. |
| 2006/0126794 A1 | 6/2006 | Hermann |
| 2006/0129062 A1 | 6/2006 | Nicoson et al. |
| 2006/0155209 A1 | 7/2006 | Miller et al. |
| 2006/0178601 A1 | 8/2006 | Wang |

(56)  References Cited

U.S. PATENT DOCUMENTS

| | | | |
|---|---|---|---|
| 2006/0257009 A1 | 11/2006 | Wang | |
| 2006/0269040 A1 | 11/2006 | Mertelmeier | |
| 2007/0003119 A1* | 1/2007 | Roehrig | G16H 10/60 |
| | | | 382/128 |
| 2007/0019846 A1 | 1/2007 | Bullitt et al. | |
| 2007/0114424 A1 | 5/2007 | Danielsson et al. | |
| 2007/0167709 A1 | 7/2007 | Slayton | |
| 2007/0225600 A1 | 9/2007 | Weibrecht et al. | |
| 2007/0232882 A1 | 10/2007 | Glossop | |
| 2007/0263765 A1 | 11/2007 | Wu | |
| 2007/0280412 A1 | 12/2007 | DeFreitas | |
| 2008/0019581 A1 | 1/2008 | Gkanatsios et al. | |
| 2008/0045833 A1 | 2/2008 | DeFreitas et al. | |
| 2008/0101537 A1 | 5/2008 | Sendai | |
| 2008/0103834 A1 | 5/2008 | Reiner | |
| 2008/0152086 A1 | 6/2008 | Hall | |
| 2008/0181361 A1 | 7/2008 | Eldered | |
| 2008/0187095 A1 | 8/2008 | Boone et al. | |
| 2008/0198966 A1 | 8/2008 | Hjarn | |
| 2008/0242968 A1 | 10/2008 | Claus et al. | |
| 2009/0003519 A1 | 1/2009 | DeFreitas | |
| 2009/0024030 A1 | 1/2009 | Lachaine | |
| 2009/0069665 A1* | 3/2009 | Valadez | G06T 7/38 |
| | | | 382/128 |
| 2009/0080604 A1 | 3/2009 | Shores et al. | |
| 2009/0118614 A1 | 5/2009 | Sendai | |
| 2009/0124906 A1 | 5/2009 | Caluser | |
| 2009/0143674 A1 | 6/2009 | Nields | |
| 2009/0171244 A1 | 7/2009 | Ning | |
| 2009/0175408 A1 | 7/2009 | Goodsitt et al. | |
| 2009/0177495 A1 | 7/2009 | Abousy et al. | |
| 2009/0296882 A1 | 12/2009 | Gkanatsios et al. | |
| 2010/0016707 A1 | 1/2010 | Amara et al. | |
| 2010/0034348 A1 | 2/2010 | Yu | |
| 2010/0098214 A1 | 4/2010 | Star-Lack et al. | |
| 2010/0135558 A1 | 6/2010 | Ruth et al. | |
| 2010/0152570 A1 | 6/2010 | Navab | |
| 2010/0166147 A1 | 7/2010 | Abenaim | |
| 2010/0208037 A1 | 8/2010 | Sendai | |
| 2010/0250275 A1* | 9/2010 | Sakagawa | G16H 50/70 |
| | | | 705/2 |
| 2010/0292571 A1* | 11/2010 | Kim | G06T 7/0012 |
| | | | 382/131 |
| 2011/0019891 A1 | 1/2011 | Puong | |
| 2011/0069808 A1 | 3/2011 | Defreitas et al. | |
| 2011/0087132 A1 | 4/2011 | DeFreitas et al. | |
| 2011/0110576 A1 | 5/2011 | Kreeger | |
| 2011/0182402 A1 | 7/2011 | Partain | |
| 2011/0237927 A1 | 9/2011 | Brooks et al. | |
| 2011/0257919 A1 | 10/2011 | Reiner | |
| 2011/0268339 A1 | 11/2011 | Volokh | |
| 2011/0313288 A1 | 12/2011 | Chi Sing | |
| 2012/0014504 A1 | 1/2012 | Jang | |
| 2012/0035462 A1 | 2/2012 | Maurer et al. | |
| 2012/0050321 A1 | 3/2012 | Arieli | |
| 2012/0134464 A1 | 5/2012 | Hoernig et al. | |
| 2012/0150034 A1 | 6/2012 | DeFreitas et al. | |
| 2012/0238870 A1 | 9/2012 | Smith et al. | |
| 2012/0256920 A1 | 10/2012 | Marshall et al. | |
| 2012/0259230 A1 | 10/2012 | Riley | |
| 2012/0302887 A1 | 11/2012 | Anderson et al. | |
| 2013/0022165 A1 | 1/2013 | Jang | |
| 2013/0044861 A1 | 2/2013 | Muller | |
| 2013/0090554 A1 | 4/2013 | Zvuloni | |
| 2013/0108138 A1 | 5/2013 | Nakayama | |
| 2013/0259193 A1 | 10/2013 | Packard | |
| 2014/0050384 A1 | 2/2014 | Schmidt et al. | |
| 2014/0064444 A1 | 3/2014 | Oh | |
| 2014/0073913 A1 | 3/2014 | DeFreitas et al. | |
| 2014/0328530 A1 | 11/2014 | Lee | |
| 2015/0051489 A1 | 2/2015 | Caluser | |
| 2015/0087984 A1 | 3/2015 | Tateyama | |
| 2015/0182191 A1 | 7/2015 | Caluser et al. | |
| 2015/0199478 A1 | 7/2015 | Bhatia et al. | |
| 2015/0245817 A1 | 9/2015 | Stone | |
| 2015/0324522 A1 | 11/2015 | Chan | |
| 2015/0347693 A1 | 12/2015 | Lam et al. | |
| 2015/0375399 A1 | 12/2015 | Chiu | |
| 2016/0000399 A1 | 1/2016 | Halmann et al. | |
| 2016/0022364 A1 | 1/2016 | DeFreitas et al. | |
| 2016/0048958 A1 | 2/2016 | Miga et al. | |
| 2016/0051215 A1 | 2/2016 | Chen | |
| 2016/0074012 A1 | 3/2016 | Forzoni | |
| 2016/0166217 A1 | 6/2016 | Davis | |
| 2016/0216769 A1 | 7/2016 | Goetz | |
| 2016/0228068 A1* | 8/2016 | Hancu | A61B 5/742 |
| 2016/0235379 A1 | 8/2016 | Homann | |
| 2016/0235380 A1* | 8/2016 | Smith | A61B 6/463 |
| 2016/0317129 A1 | 11/2016 | Seip | |
| 2016/0328998 A1 | 11/2016 | Pedersen | |
| 2016/0361025 A1 | 12/2016 | Reicher et al. | |
| 2016/0364630 A1* | 12/2016 | Reicher | G06T 7/0014 |
| 2017/0181809 A1 | 6/2017 | Panescu | |
| 2017/0185904 A1 | 6/2017 | Padmanabhan | |
| 2017/0193655 A1 | 7/2017 | Madabhushi | |
| 2017/0213131 A1 | 7/2017 | Hammond | |
| 2017/0251991 A1 | 9/2017 | Wang | |
| 2017/0265947 A1 | 9/2017 | Dyer | |
| 2017/0301081 A1 | 10/2017 | Yang et al. | |
| 2017/0340303 A1 | 11/2017 | Stango | |
| 2017/0364645 A1 | 12/2017 | Jester | |
| 2018/0018590 A1 | 1/2018 | Szeto | |
| 2018/0068066 A1 | 3/2018 | Bronkalla | |
| 2018/0125446 A1 | 5/2018 | Boroczky | |
| 2018/0249985 A1 | 9/2018 | DeFreitas | |
| 2018/0256118 A1 | 9/2018 | DeFreitas | |
| 2018/0286504 A1 | 10/2018 | Trovato | |
| 2019/0015058 A1 | 1/2019 | Valenzuela | |
| 2019/0015173 A1 | 1/2019 | DeFreitas | |
| 2019/0057778 A1* | 2/2019 | Porter | G16H 50/50 |
| 2019/0064929 A1 | 2/2019 | Tomeh | |
| 2019/0111282 A1 | 4/2019 | Yamada | |
| 2019/0138693 A1 | 5/2019 | Muller et al. | |
| 2019/0155633 A1 | 5/2019 | Faulhaber, Jr. | |
| 2019/0188848 A1 | 6/2019 | Madani et al. | |
| 2019/0189263 A1 | 6/2019 | Stoval, III et al. | |
| 2019/0201106 A1 | 7/2019 | Siemionow et al. | |
| 2019/0221304 A1 | 7/2019 | Ionasec | |
| 2019/0228524 A1 | 7/2019 | Chen et al. | |
| 2019/0272640 A1* | 9/2019 | Sugahara | G06V 10/776 |
| 2019/0290221 A1 | 9/2019 | Smith | |
| 2019/0295248 A1 | 9/2019 | Nakamura et al. | |
| 2019/0328842 A1 | 10/2019 | Izmirili | |
| 2020/0043600 A1 | 2/2020 | Glottmann et al. | |
| 2020/0046303 A1 | 2/2020 | DeFreitas | |
| 2020/0093562 A1 | 3/2020 | Defreitas et al. | |
| 2020/0160510 A1 | 5/2020 | Lindemer | |
| 2020/0167920 A1 | 5/2020 | Hall et al. | |
| 2020/0205928 A1 | 7/2020 | Defreitas et al. | |
| 2020/0211692 A1 | 7/2020 | Kalafut | |
| 2020/0284591 A1 | 9/2020 | Shapira | |
| 2020/0286613 A1 | 9/2020 | Rego | |
| 2020/0311938 A1 | 10/2020 | Vincent | |
| 2020/0323512 A1* | 10/2020 | Ng | A61B 8/085 |
| 2020/0345324 A1 | 11/2020 | Matsumoto | |
| 2020/0352543 A1 | 11/2020 | DeFreitas | |
| 2020/0357118 A1 | 11/2020 | Yao | |
| 2020/0381125 A1 | 12/2020 | Hao et al. | |
| 2020/0390404 A1 | 12/2020 | DeFreitas | |
| 2021/0000553 A1 | 1/2021 | St. Pierre | |
| 2021/0027883 A1 | 1/2021 | Kumar et al. | |
| 2021/0030366 A1 | 2/2021 | Chen | |
| 2021/0035680 A1 | 2/2021 | Chen | |
| 2021/0038921 A1 | 2/2021 | Nguyen | |
| 2021/0085387 A1* | 3/2021 | Amit | A61B 18/1492 |
| 2021/0098120 A1 | 4/2021 | Kshirsagar | |
| 2021/0100626 A1 | 4/2021 | St. Pierre | |
| 2021/0128268 A1 | 5/2021 | Rulkov | |
| 2021/0224508 A1 | 7/2021 | Laviola | |
| 2021/0256289 A1 | 8/2021 | Kumagi | |
| 2021/0303078 A1 | 9/2021 | Wells | |
| 2021/0343016 A1* | 11/2021 | Tian | G06V 30/274 |
| 2021/0390775 A1* | 12/2021 | Ratner | G06T 17/10 |
| 2021/0398650 A1 | 12/2021 | Baker | |

(56) References Cited

U.S. PATENT DOCUMENTS

| | | |
|---|---|---|
| 2022/0000491 A1 | 1/2022 | Henry |
| 2022/0133258 A1 | 5/2022 | Yin et al. |
| 2022/0164586 A1 | 5/2022 | Chui |
| 2022/0164951 A1 | 5/2022 | Chui |
| 2022/0265387 A1 | 8/2022 | Daon |
| 2022/0405644 A1 | 12/2022 | Szeto |
| 2023/0098785 A1 | 3/2023 | St. Pierre |
| 2023/0285081 A1* | 9/2023 | Wagner .................. A61B 34/10 |
| 2024/0021297 A1 | 1/2024 | Kshirsagar |
| 2024/0242820 A1 | 7/2024 | Kshirsagar |
| 2025/0140389 A1 | 5/2025 | Kshirsagar |

FOREIGN PATENT DOCUMENTS

| | | |
|---|---|---|
| CN | 101360453 | 2/2009 |
| CN | 101517582 | 8/2009 |
| CN | 101959456 A | 1/2011 |
| CN | 102016859 A | 4/2011 |
| CN | 102429678 | 5/2012 |
| CN | 102448375 | 5/2012 |
| CN | 102473300 A | 5/2012 |
| CN | 102855483 A | 1/2013 |
| CN | 105025799 A | 11/2015 |
| CN | 108140425 | 6/2018 |
| CN | 108463270 A | 8/2018 |
| CN | 108492874 | 9/2018 |
| CN | 202161328 | 9/2018 |
| CN | 111584046 | 8/2020 |
| DE | 103 05 640 | 8/2003 |
| DE | 102011087127 | 5/2013 |
| EP | 1428473 | 6/2004 |
| EP | 2236085 | 6/2010 |
| EP | 2491863 | 8/2012 |
| EP | 1986548 | 1/2013 |
| EP | 2686789 | 10/2013 |
| EP | 3060132 | 4/2019 |
| JP | H07253963 A | 10/1995 |
| JP | 2003-527880 | 9/2003 |
| JP | 2003-531516 | 10/2003 |
| JP | 2005125080 | 5/2005 |
| JP | 2006-505376 | 2/2006 |
| JP | 2006-51964 | 8/2006 |
| JP | 2007-130487 | 5/2007 |
| JP | 2007-515242 | 6/2007 |
| JP | 2008518722 | 6/2008 |
| JP | 2009502347 | 1/2009 |
| JP | 2009-522005 | 6/2009 |
| JP | 2009-157527 | 7/2009 |
| JP | 2009-526618 | 7/2009 |
| JP | 2010-137004 | 6/2010 |
| JP | 2011-508242 | 3/2011 |
| JP | 2012-501750 | 1/2012 |
| JP | 2014-507250 | 3/2014 |
| JP | 2015-506794 | 3/2015 |
| JP | 2015-065975 | 4/2015 |
| JP | 2016-035739 | 3/2016 |
| JP | 2019-016235 | 1/2019 |
| JP | 2019-170794 | 10/2019 |
| JP | 2020-048685 | 4/2020 |
| JP | 2020-156823 | 10/2020 |
| KR | 10-2013857 | 8/2019 |
| WO | 93/17620 | 9/1993 |
| WO | 94/06352 | 3/1994 |
| WO | 1997/00649 | 1/1997 |
| WO | 00/51484 | 9/2000 |
| WO | 0154463 | 7/2001 |
| WO | 2005/052838 | 6/2005 |
| WO | 2005/079306 A2 | 9/2005 |
| WO | 2005/110230 | 11/2005 |
| WO | 2005/112767 | 12/2005 |
| WO | 2006/055830 | 5/2006 |
| WO | 2006/058160 | 6/2006 |
| WO | 2007/095330 | 8/2007 |
| WO | 08/014670 | 2/2008 |
| WO | 2008/054436 | 5/2008 |
| WO | 2009/026587 | 2/2009 |
| WO | 2010/028208 | 3/2010 |
| WO | 2011/043838 | 4/2011 |
| WO | 2011/063530 | 6/2011 |
| WO | 2012/001572 | 1/2012 |
| WO | 2012/068373 | 5/2012 |
| WO | 2012/073164 | 6/2012 |
| WO | 2012/112627 | 8/2012 |
| WO | 2012/122399 | 9/2012 |
| WO | 2013/001439 | 1/2013 |
| WO | 2013/078476 | 5/2013 |
| WO | 2013/123091 | 8/2013 |
| WO | 2014/194171 | 12/2014 |
| WO | 2015/061582 | 4/2015 |
| WO | 2016/103094 | 6/2016 |
| WO | 2016/184746 | 11/2016 |
| WO | 2017/058848 | 4/2017 |
| WO | 2017/197476 | 11/2017 |
| WO | 2017/218773 | 12/2017 |
| WO | 2019/030410 | 2/2019 |
| WO | 2019/060843 | 3/2019 |
| WO | 2016/057960 | 5/2019 |
| WO | 2019/091807 A1 | 5/2019 |
| WO | 2019/102917 | 5/2019 |
| WO | 2019/227042 | 11/2019 |
| WO | 2018/221689 | 4/2020 |
| WO | 2020/216307 | 10/2020 |
| WO | 2021/168281 A1 | 8/2021 |
| WO | 2021/195370 A1 | 9/2021 |

OTHER PUBLICATIONS

"Filtered Back Projection", (NYGREN), published May 8, 2007, 2.html, 2 pgs.

"Supersonic to feature Aixplorer Ultimate at ECR", AuntiMinnie. com, 3 pages (Feb. 2018).

Berg, WA et al., "Combined screening with ultrasound and mammography vs mammography alone in women at elevated risk of breast cancer", JAMA 299:2151-2163, 2008.

Burbank, Fred, "Stereotactic Breast Biopsy: Its History, Its Present, and Its Future", published in 1996 at the Southeastern Surgical Congress, 24 pages.

Bushberg, Jerrold et al., "The Essential Physics of Medical Imaging", 3rd ed., In: "The Essential Physics of Medical Imaging, Third Edition", Dec. 28, 2011, Lippincott & Wilkins, Philadelphia, PA, USA, XP05579051, pp. 270-272.

Carton, AK, et al., "Dual-energy contrast-enhanced digital breast tomosynthesis—a feasibility study", Br J Radiol. Apr. 2010;83 (988):344-50.

Chen, SC, et al., "Initial clinical experience with contrast-enhanced digital breast tomosynthesis", Acad Radio. Feb. 2007 14(2):229-38.

Choi Bareum et al., "Surgical-tools detection based on Convolutional Neural Network in laparoscopic robot-assisted surgery", 2017 39th Annual International Conference of the IEEE Engineering in Medicine and Biology Society (EMBC), IEEE, Jul. 11, 2017, pp. 1756-1759.

Diekmann, F., et al., "Digital mammography using iodine-based contrast media: initial clinical experience with dynamic contrast medium enhancement", Invest Radiol 2005; 40:397-404.

Dromain C., et al., "Contrast enhanced spectral mammography: a multi-reader study", RSNA 2010, 96th Scientific Assembly and Scientific Meeting.

Dromain, C., et al., "Contrast-enhanced digital mammography", Eur J Radiol. 2009; 69:34-42.

Dromain, Clarisse et al., "Dual-energy contrast-enhanced digital mammography: initial clinical results", European Radiology, Sep. 14, 2010, vol. 21, pp. 565-574.

E. Shaw de Paredes et al., "Interventional Breast Procedure", published Sep./Oct. 1998 in Curr Probl Diagn Radiol, pp. 138-184.

Fischer Imaging Corp, Mammotest Plus manual on minimally invasive breast biopsy system, 2002, 8 pages.

Fischer Imaging Corporation, Installation Manual, MammoTest Family of Breast Biopsy Systems, 86683G, 86684G, P-55957-IM, Issue 1, Revision 3, Jul. 2005, 98 pages.

(56) References Cited

OTHER PUBLICATIONS

Fischer Imaging Corporation, Operator Manual, MammoTest Family of Breast Biopsy Systems, 86683G, 86684G, P-55956-OM, Issue 1, Revision 6, Sep. 2005, 258 pages.

Freiherr, G., "Breast tomosynthesis trials show promise", Diagnostic Imaging—San Francisco 2005, V27; N4:42-48.

Georgian-Smith, Dianne, et al., "Stereotactic Biopsy of the Breast Using an Upright Unit, a Vacuum-Suction Needle, and a Lateral Arm-Support System", 2001, at the American Roentgen Ray Society meeting, 8 pages.

Giger et al. "Development of a smart workstation for use in mammography", in Proceedings of SPIE, vol. 1445 (1991), pp. 101103; 4 pages.

Giger et al., "An Intelligent Workstation for Computer-aided Diagnosis", in RadioGraphics, May 1993, 13:3 pp. 647-656; 10 pages.

Hologic, "Lorad StereoLoc II" Operator's Manual 9-500-0261, Rev. 005, 2004, 78 pgs.

Hologic, Inc., 510(k) Summary, prepared Nov. 28, 2010, for Affirm Breast Biopsy Guidance System Special 510(k) Premarket Notification, 5 pages.

Hologic, Inc., 510(k) Summary, prepared Aug. 14, 2012, for Affirm Breast Biopsy Guidance System Special 510(k) Premarket Notification, 5 pages.

ICRP Publication 60: 1990 Recommendations of the International Commission on Radiological Protection, 12 pages.

Jochelson, M., et al, "Bilateral Dual Energy contrast-enhanced digital mammography: Initial Experience", RSNA 2010, 96th Scientific Assembly and Scientific Meeting, 1 page.

Jong, RA, et al., Contrast-enhanced digital mammography: initial clinical experience. Radiology 2003; 228:842-850.

Koechli, Ossi R., "Available Sterotactic Systems for Breast Biopsy", Renzo Brun del Re (Ed.), Minimally Invasive Breast Biopsies, Recent Results in Cancer Research 173:105-113; Springer-Verlag, 2009.

Kopans, et al. Will tomosynthesis replace conventional mammography? Plenary Session SFN08: Rsna 2005.

Lehman, CD, et al. MRI evaluation of the contralateral breast in women with recently diagnosed breast cancer. N Engl J Med 2007; 356:1295-1303.

Lewin, JM, et al., Dual-energy contrast-enhanced digital subtraction mammography: feasibility. Radiology 2003; 229:261-268.

Lindfors, KK, et al., Dedicated breast CT: initial clinical experience. Radiology 2008; 246(3): 725-733.

Niklason, L., et al., Digital tomosynthesis in breast imaging. Radiology. Nov. 1997; 205(2):399-406.

PCT International Preliminary Report on Patentability in International Application PCT/US2021/047788, mailed Mar. 30, 2023, 12 pages.

Poplack, SP, et al, Digital breast tomosynthesis: initial experience in 98 women with abnormal digital screening mammography. AJR Am J Roentgenology Sep. 2007 189(3):616-23.

Prionas, ND, et al., Contrast-enhanced dedicated breast CT: initial clinical experience. Radiology. Sep. 2010 256(3):714-723.

Rafferty, E. et al., "Assessing Radiologist Performance Using Combined Full-Field Digital Mammography and Breast Tomosynthesis Versus Full-Field Digital Mammography Alone: Results" presented at 2007 Radiological Society of North America meeting, Chicago IL.

Reynolds, April, "Stereotactic Breast Biopsy: A Review", Radiologic Technology, vol. 80, No. 5, Jun. 1, 2009, pp. 447M-464M, XP055790574.

Shrading, Simone et al., "Digital Breast Tomosynthesis-guided Vacuum-assisted Breast Biopsy: Initial Experiences and Comparison with Prone Stereotactic Vacuum-assisted Biopsy", the Department of Diagnostic and Interventional Radiology, Univ. of Aachen, Germany, published Nov. 12, 2014, 10 pgs.

Smith, A., "Full field breast tomosynthesis", Radiol Manage. Sep.-Oct. 2005; 27(5):25-31.

Weidner N, et al., "Tumor angiogenesis and metastasis: correlation in invasive breast carcinoma", New England Journal of Medicine 1991; 324:1-8.

Weidner, N, "The importance of tumor angiogenesis: the evidence continues to grow", AM Clin Pathol. Nov. 2004 122(5):696-703.

Blane, C. et al., "New Compression Paddle for Wire Localization in Mammography", Academic Radiology, 17(2): 142-145 (2010).

Bram Van Ginneken, Computer-aided Diagnosis in Chest Radiography Thesis, Image Sciences Institute, University Medical Center Utrecht, Utrecht, Netherlands.

Carson, P. et al., "Local compression in automated breast ultrasound in the mammographic geometry", Ultrasonics Symposium, 1787-1790 (2010).

Gutierrez et al., "Multimodality image guidance system integrating X-ray fluoroscopy and ultrasound image streams with electromagnetic tracking", Medical Imaging 2007: Visualization and Image-Guided Procedures, Proc. of SPIE vol. 6509, 2007, pp. 1-10.

Vaartjes, S.E. et al., "First clinical trials of the twente photoacoustic mammoscope (PAM)", Visual Communications and Image Processing; Jan. 20, 2004, San Jose, CA, UDS, vol. 6629, Jan. 1, 2007, pp. 1-12.

Y. Yading et al., "Correlative feature analysis on FFDM", Med. Phys. 35(12): 5490-5500 (2008).

X. Han et al., "MatchNet: Unifying Feature and Metric Learning for Patch-Based Matching", IEEE Conference on Computer Vision and Pattern Recognition (CVPR): 3279-3286 (2015).

International Search Report and Written Opinion for PCT/US2021/047788 (Jan. 5, 2022).

Bouget, David, et al., "Vision-based and marker-less surgical tool detection and tracking: a review of the literature", Medical Image Analysis, published Sep. 13, 2016, DOI:https://doi.org/10.1016/j.media.2016.09.003, 29 pages.

* cited by examiner

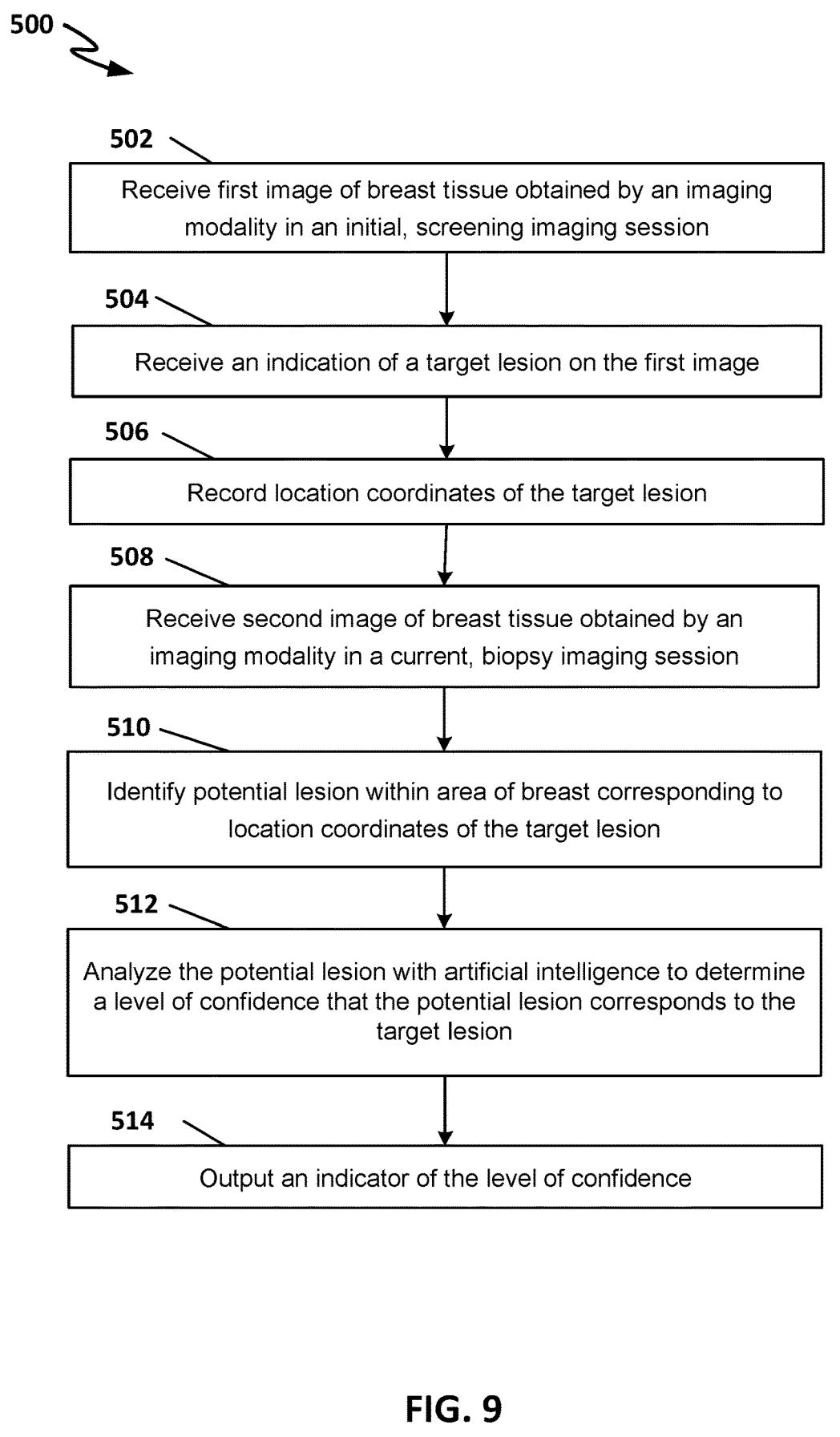

500

502

Receive first image of breast tissue obtained by an imaging modality in an initial, screening imaging session

504

Receive an indication of a target lesion on the first image

506

Record location coordinates of the target lesion

508

Receive second image of breast tissue obtained by an imaging modality in a current, biopsy imaging session

510

Identify potential lesion within area of breast corresponding to location coordinates of the target lesion

512

Analyze the potential lesion with artificial intelligence to determine a level of confidence that the potential lesion corresponds to the target lesion

514

Output an indicator of the level of confidence

FIG. 9

CORRELATING REGIONS OF INTEREST

CROSS-REFERENCE TO RELATED APPLICATIONS

This application is a National Stage Application of PCT/US2021/047788 filed on Aug. 26, 2021, which claims the benefit of priority to U.S. Provisional Patent Application No. 63/080,193, filed Sep. 18, 2020, the entire disclosures of which are incorporated by reference in their entireties. To the extent appropriate, a claim of priority is made to each of the above disclosed applications.

BACKGROUND

Medical imaging provides a non-invasive method to visualize the internal structure of a patient. Medical imaging is used to screen for and diagnose cancer in a patient. For example, early screening can detect potentially cancerous lesions so that treatment can take place at an early stage in the disease. One medical imaging technique is mammography, which uses x-ray radiation to visualize breast tissue and is often used to screen patients for potentially cancerous lesions. Traditional mammograms involve acquiring two-dimensional or three-dimensional images of the breast from various angles. Mammography is typically performed while the patient is standing and the patient's breast tissue is under compression. Mammography can be used as an initial screening technique to identify potentially cancerous lesions as well as for use in confirming a lesion to be sampled during a biopsy procedure. It is against this background that the present disclosure is made. Techniques and improvements are provided herein.

SUMMARY

In an example, there is a method of locating of a lesion within a breast. The method includes: receiving, at a computing device, an initial image of a target lesion within the breast, wherein the initial image was generated during an initial imaging session; receiving, at the computing device, a current image of the breast obtained during a current biopsy session: receiving, at the computing device, an indication of a location of a potential lesion in the current image: analyzing, with a machine learning lesion classifier, the potential lesion to compare the potential lesion to the target lesion and determine a level of confidence that the potential lesion corresponds to the target lesion; and outputting an indicator of the level of confidence for display on a graphical user interface.

In a further example, there is a lesion identification system comprising: a processing device; and a memory storing instructions. The instructions, when executed by the processing device, facilitate performance of operations that include: accessing an initial x-ray image of a breast, the initial x-ray image including an identified lesion indicated with a visual marker: receiving a current x-ray image of the breast, the current x-ray image including an indication of a potential lesion: analyzing the potential lesion and the identified lesion using an artificial intelligence lesion classifier; generating a confidence score indicating a likelihood that the potential lesion in the current x-ray image matches the identified lesion in the initial x-ray image; and displaying an output associated with the confidence score on a graphical user interface.

In another example, there is a non-transitory machine-readable storage medium, comprising executable instructions that, when executed by a processor, facilitate performance of operations. The operations include: obtaining data for a target lesion from a data store, wherein the data was obtained with x-ray imaging and includes at least an initial image of the target lesion and coordinates for a location of the target lesion within a breast: recording a current image of the breast obtained by x-ray imaging: identifying a general area of interest in the current image of the breast based on the coordinates of the target lesion: identifying a potential lesion in the general area of interest: analyzing, using an artificial intelligence lesion classifier, the potential lesion to compare the potential lesion to the target lesion and determine a level of confidence that the potential lesion corresponds to the target lesion; and outputting an indicator of the level of confidence on a graphical user interface.

The details of one or more techniques are set forth in the accompanying drawings and the description below. Other features, objects, and advantages of these techniques will be apparent from the description, drawings, and claims.

BRIEF DESCRIPTION OF THE DRAWINGS

FIG. 9 is a flow diagram illustrating an example method of identifying a region of interest within a breast.

DETAILED DESCRIPTION

The present disclosure is directed to techniques for locating a lesion within breast tissue using an imaging device. In an example implementation, a computing system uses machine learning to provide a confidence level indicator for a correlation between a lesion identified in a first image (e.g., an initial mammography image) and a second image (e.g., a current, confirmatory mammography image used during an image-guided biopsy procedure).

An image guided breast biopsy is typically performed, after a suspicious lesion (calcification cluster or mass lesion) is identified after screening and diagnostic imaging. During a breast biopsy procedure, typically only a restricted and small area of the breast is localized and imaged. At the beginning of the procedure, the radiologist confirms that the same suspicious lesion is within the restricted breast area, so that biopsy can be performed accurately. This is typically done by radiologist visually looking at the images and confirming the lesion is the same one seen on previous mammograms. However due to changes in breast positions, geometries, and that only a small area of the entire breast is imaged in biopsy setup, sometimes the radiologist becomes unsure if the lesion in question is localized within the biopsy window.

Disclosed techniques include the use of an artificial intelligence algorithm (e.g., a deep-learning based algorithm) to detect and compare a lesion imaged in biopsy with a lesion identified from prior screening or diagnostics (e.g., mammography). The algorithm automatically determines if the lesions are the same or provides an indication of the likelihood that the lesions are the same. Accurate algorithm performance is relevant to improving the accuracy of a biopsy procedure.

In an example, before an image-guided biopsy is performed, the two-dimensional or three-dimensional image or a limited area of that image showing the lesion to be biopsied is sent to the biopsy system computer. After the first biopsy image is acquired, the artificial intelligence algorithm automatically detects one or more lesions within the biopsy image area. The artificial intelligence algorithm then compares the one or more lesions to the one or more lesions from the prior two-dimensional or three-dimensional image (e.g., the initial image from a screening session) and produce a visual display or audio to alert the radiologist if the lesions are the same or not.

Example System

Figure 1:
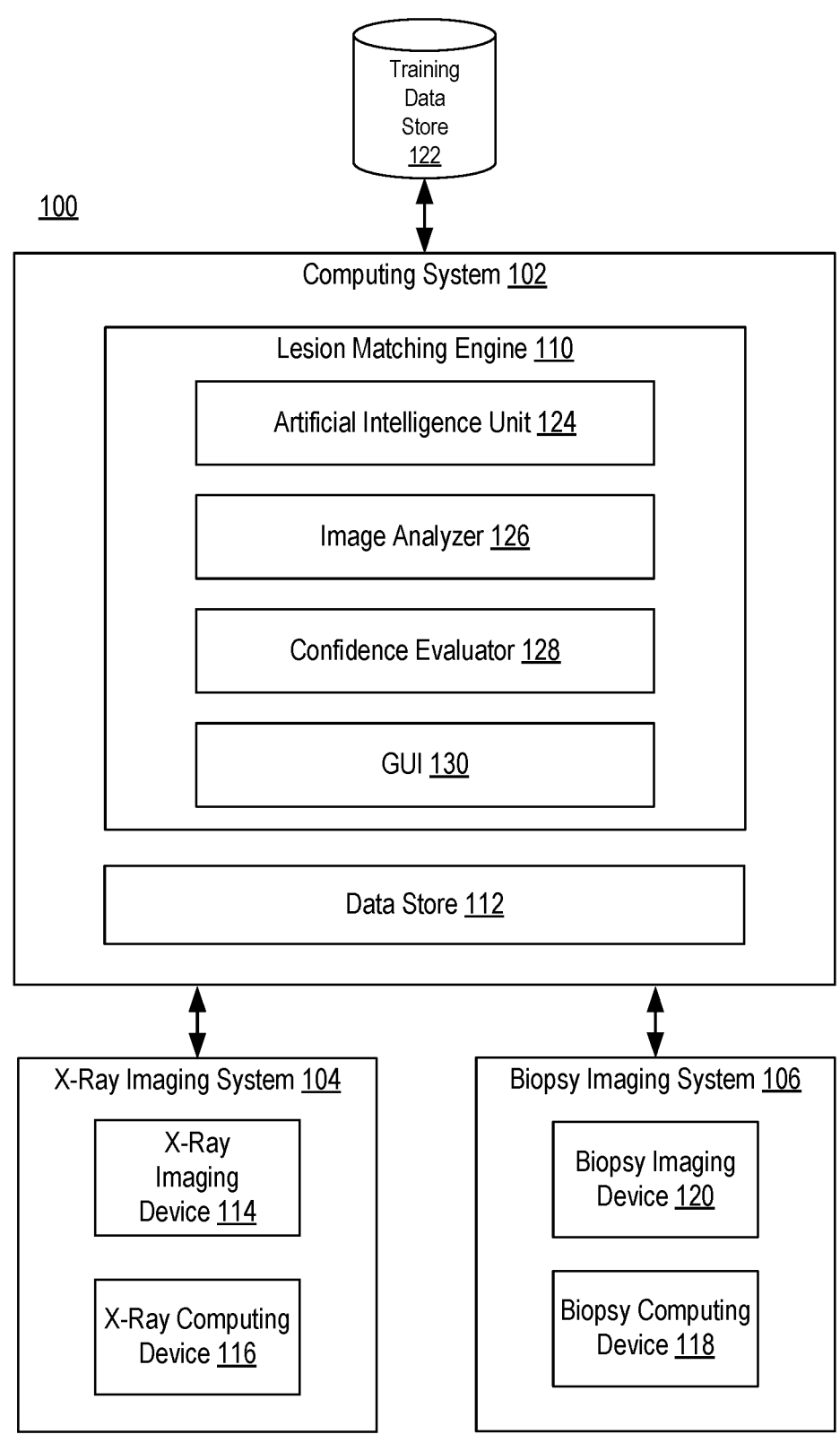
FIG. 1 illustrates an example system for locating a region of interest within a breast.

FIG. 1 illustrates an example lesion identification system 100 for locating a region of interest within a breast. The system 100 includes a computing system 102, an x-ray imaging system 104, and a biopsy imaging system 106. In some examples, the lesion identification system 100 operates to guide a technician to a location of interest in a breast during imaging performed during a biopsy based on data collected during an x-ray imaging procedure where the location of interest was first identified. The lesion identification system 100 provides a confidence level indicator to a technician on a display to aid the technician in confirming that a lesion visible on the biopsy x-ray image is the same lesion identified previously in an x-ray image.

The computing system 102 operates to process and store information received from the x-ray imaging system 104 and biopsy imaging system 106. In the example of FIG. 1, the computing system 102 includes a lesion matching engine 110 and a data store 112. In some examples, the lesion matching engine 110 and data store 112 are housed within the memory of the computing system 102. In some examples, the computing system 102 accesses the lesion matching engine 110 and data store 112 of a remote server, such as a cloud computing environment. Though FIG. 1 shows the computing system 102 as separate from other components of the system 100, the computing system 102 can also be incorporated into the x-ray computing device 116, the biopsy computing device 118, or another computing device used in patient care.

The lesion matching engine 110 operates to analyze images of a target lesion and a potential lesion to determine if the potential lesion is the same as the target lesion. In the example of FIG. 1, a data store of training data 122 is used to train an artificial intelligence unit 124. The training data store 122 stores multiple example cases of identified lesions with one or more corresponding screening images and biopsy images. The example cases are matches confirmed by healthcare professionals. The artificial intelligence unit 124 analyzes these example cases using a machine learning algorithm to identify features that can be used to match screening and biopsy images. In some examples, the artificial intelligence unit 124 can be referred to as an artificial intelligence lesion classifier. Such an artificial intelligence unit 124 can be configured to, for example, analyze lesions and generate a confidence score indicating a likelihood that the potential lesion matches the target lesion.

Various machine learning techniques can be used to generate a lesion classifier. In some examples, the machine learning algorithm is a supervised machine learning algorithm. In other examples, the machine learning algorithm is an unsupervised machine learning algorithm. In some examples, the machine learning algorithm is based on an artificial neural network. In some examples, the neural network is a deep neural network. In some examples, the machine learning algorithm is a convolutional deep neural network. In some examples, a combination of two or more networks are used to generate the classifier. In some examples, two or more algorithms are uses to generate features from the example case data.

In an example, the lesion matching engine 110 is partially or wholly implemented using MATCHNET. MATCHNET provides a deep convolutional network that extracts features and a network of layers that computes a similarity between the extracted features. For example, MATCHNET or a modification thereof is trained to compare initial and current x-ray images to determine a confidence that the images include a same lesion. MATCHNET is described in "Match-Net: Unifying feature and metric learning for patch-based matching" by Xufeng Han. T. Leung, Y. Jia. R. Sukthankar and A. C. Berg, which was published in 2015 *IEEE Conference on Computer Vision and Pattern Recognition* (*CVPR*), Boston, MA, 2015, pp. 3279-3286, doi: 10.1109/CVPR.2015.7298948.

Training data from the training data store 122 can be used to generate an image classifier. For example, the artificial intelligence unit 124 is initialized with default or initial attributes (e.g., weights of connections in a neural network). The training data from the training data store 122 is provided to the artificial intelligence unit 124 and an output is obtained. The output is compared with an expected value to generate a loss value from a loss function. The attributes of the artificial intelligence unit 124 are then modified based on the loss value. This process of training, generating a loss value, and modifying is repeated until the loss value is sufficiently small, thereby training the model. The resulting trained machine learning classifier is used by the image analyzer 126 to compare sets of screening images and biopsy images. Various indicators or features of the lesion or images can be used to compare lesions including shape, color, margins, orientation, texture, pattern, density, stiffness, size, and depth within the breast. In some examples, the indicator is a numerical value of the extent of the feature.

The confidence evaluator 128 operates in conjunction with the image analyzer 126 to determine a level of confidence that a potential lesion during screening is the same as a lesion about to be biopsied. In some examples, a confidence score is generated by the confidence evaluator 128. In some examples, the confidence level could indicate a category of confidence such as "high," "medium," or "low". In alternative examples, the confidence level is provided as a percentage such as 99% 75%, or 44%. In some examples the artificial intelligence unit 124 provides its own confidence rating.

Figure 10:
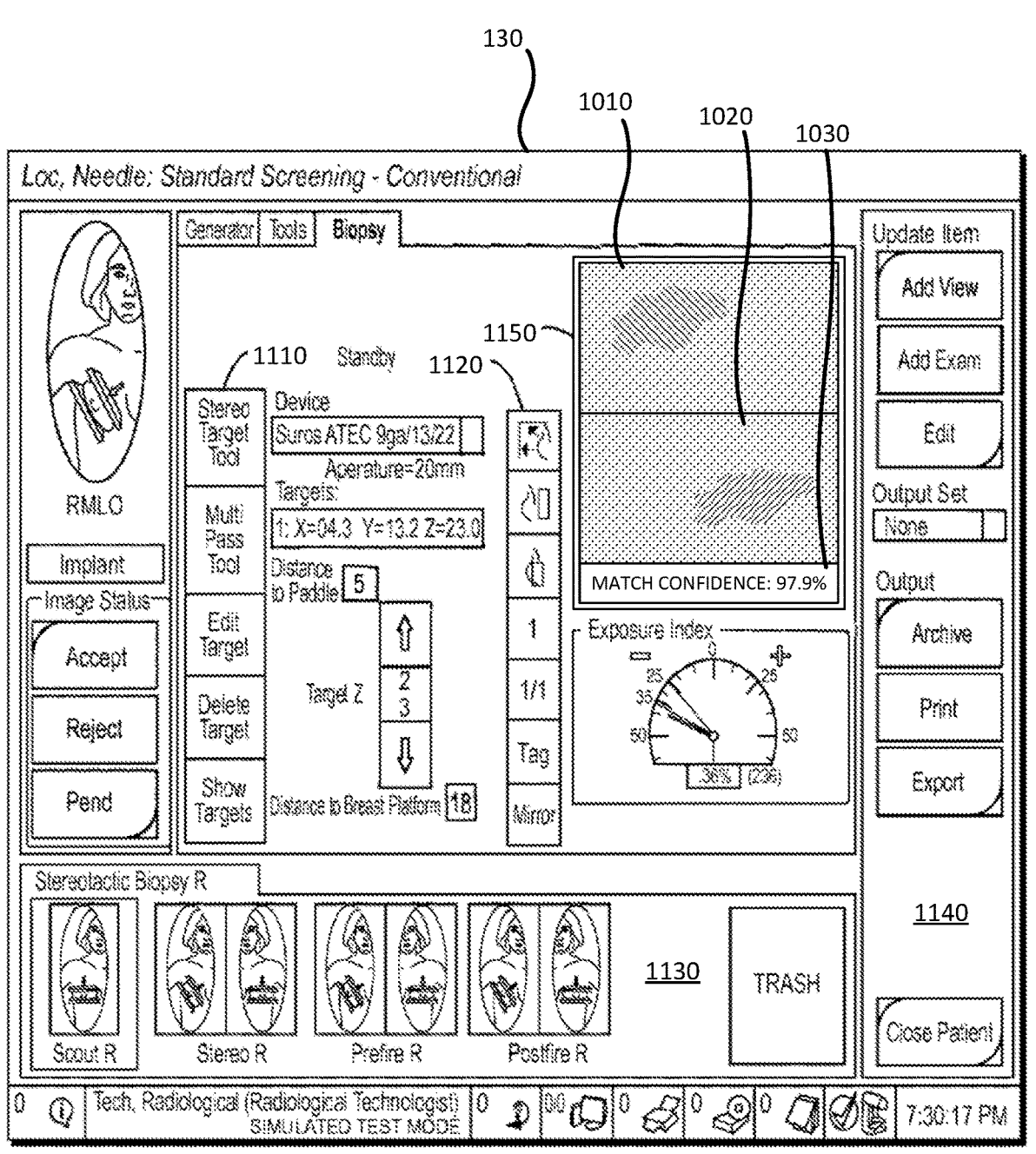
FIG. 10 illustrates an example display of the graphical user interface of FIG. 1.

The graphical user interface (GUI) 130 operates to present information on a display of a computing device. In some examples, the GUI 130 display a confidence level indicator over one or more images of tissue being analyzed. An example GUI 130 is shown in FIG. 10.

The data store 112 operates to store information received from the x-ray imaging system 104, biopsy imaging system 106, and lesion matching engine 110, among other sources. In some examples, the data store 112 is two or more separate data stores. For example, one data store is a remote data store that stores images from x-ray imaging systems. Another data store can be housed locally within the computing system 102. In some examples, the data store 112 is part of an electronic medical record system.

The x-ray imaging system 104 operates to take images of breast tissue using x-ray radiation. The x-ray imaging system 104 includes an x-ray imaging device 114 and an x-ray computing device 116 in communication with the x-ray imaging device 114. In some examples, the x-ray imaging system 104 performs digital breast tomosynthesis or mammography. The resulting images can include two-dimensional or three-dimensional images. An example x-ray imaging device 114 is described in further detail in relation to FIGS. 3-5. The x-ray computing device 116 operates to receive inputs from a healthcare provider to operate the x-ray imaging device 114 and view images received from the x-ray imaging device 114.

The biopsy imaging system 106 operates to take images of breast tissue for use while performing a biopsy. The biopsy imaging system 106 can further include components for performing a biopsy on visualized breast tissue. An example biopsy imaging system 106 is described in further detail in relation to FIGS. 6-7. The biopsy imaging system 106 includes a biopsy computing device 118 and a biopsy imaging device 120. The biopsy computing device 118 operates to receive inputs from a healthcare provider to operate the biopsy imaging device 120 and view images received from the biopsy imaging device 120.

Information obtained from an x-ray imaging system 104 can be used by a biopsy imaging system 106. A healthcare provider operates the x-ray computing device 116 to capture x-ray images of the breast of a patient using the x-ray imaging device 114. The x-ray image may be taken as part of a routine health screening. During the screening, the healthcare provider identifies one or more regions of interest in the patient's breast that require a biopsy.

In some examples, coordinates for the regions of interest are recorded at the x-ray computing device 116 and communicated to the computing system 102. The coordinates recorded by the x-ray computing device 116 are analyzed using a tissue deformation model, as described in co-pending U.S. Provisional Patent Application 63/000,700, the entirety of which is hereby incorporated by reference for any and all purposes.

In some examples, a first set of coordinates identifies a location of a lesion identified while the breast is under compression. The first set of coordinates can then be used by the biopsy imaging system 106 to help the healthcare provider locate the lesion for biopsy.

In some examples, the x-ray images obtained from the x-ray imaging system 104 are displayed on a user interface of the biopsy computing device 118 along with one or more biopsy images that are received from the biopsy imaging device 120 prior to performing the biopsy (e.g., images of the region being biopsied). The biopsy procedure can include obtaining images to locate the region of interest before the biopsy of the tissue and can also perform pre-fire and post fire imaging. The biopsy images can include the one or more images used to locate the region of interest. In some examples, the biopsy images can correspond to other images, such as pre-fire and post-fire images. Additional information can be displayed on the biopsy computing device 118 such as predicted coordinates of a region of interest and indications of biomarkers on an image of the patient's breast. In some examples, a visual marker is displayed on the image indicating the location of a target lesion. The healthcare provider operating the biopsy computing device 118 locates a potential lesion in an image obtained using the biopsy imaging device that is potentially a match for a lesion previously identified in an initial x-ray image for the same patient (e.g., initially obtained during a screening procedure for the patient). The image and an indication of the potential lesion are communicated to the computing system 102 for analysis. In some examples, an initial image (e.g., from a prior mammography session, such as the one during which the lesion was identified), a target region of interest, and a current image (e.g., an image obtained during the biopsy session) are displayed on the same GUI. The GUI 130 helps to visually guide an operator of the biopsy imaging system 106 to the region of interest. The biopsy imaging system 106 can further automate documentation of a biopsy probe's position, orientation, and annotations.

In some examples, x-ray images including an identified lesion and biopsy images including a potential lesion are analyzed by the lesion matching engine 110 of the computing system 102. The lesion matching engine 110 outputs a confidence level indicator for the potential lesion and communicates that confidence level indicator to the biopsy computing device 118. The confidence level indicator can be a numeric value, a color, or a category that is displayed on a GUI on the biopsy computing device 118.

Figure 2:
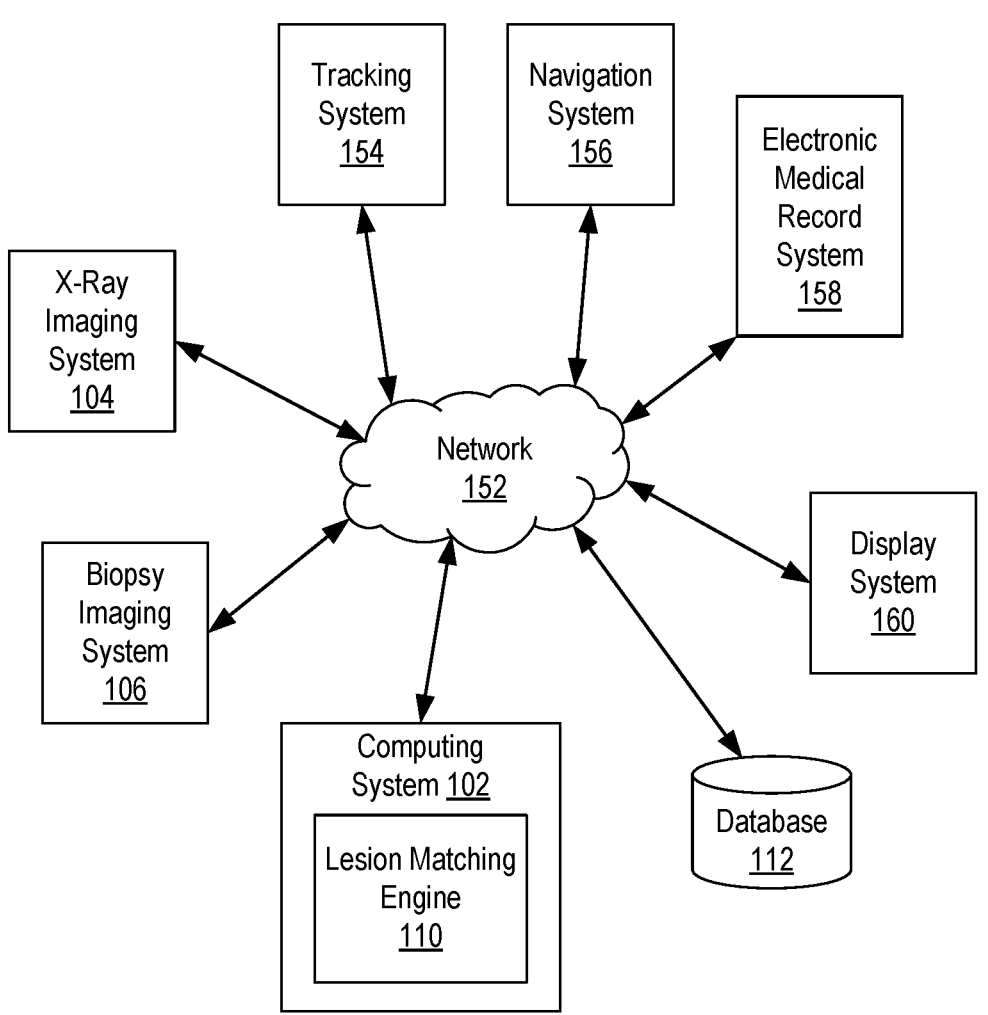
FIG. 2 illustrates a schematic diagram of an example system for managing healthcare data, including imaging data.

FIG. 2 illustrates a schematic diagram of an example system 150 for managing healthcare data, such as imaging data. The system 150 includes multiple computing components in communication with one another through a communication network 152. The computing components can include a tracking system 154, a navigation system 156, an electronic medical record system 158, and a display system 160 in addition to the computing system 102, x-ray imaging system 104, and biopsy imaging system 106 described in FIG. 1.

It should be noted that, although the "systems" are shown in FIG. 1 as functional blocks, different systems may be integrated into a common device, and the communication link may be coupled between fewer than all of the systems: for example, the tracking system 154, navigation system 156 and display system 160 may be included in an acquisition workstation or a technologist workstation which may control the acquisition of the images in a radiology suite. Alternatively, the navigation system 156 and tracking system 154 may be integrated into the biopsy imaging system 106, or provided as standalone modules with separate communication links to the display 160, x-ray imaging system 104 and biopsy imaging system 106. Similarly, skilled persons will additionally appreciate that communication network 152 can be a local area network, wide area network, wireless network, the Internet, intranet, another similar communication network or combinations thereof.

In one example, the x-ray imaging system 104 is a tomosynthesis acquisition system which captures a set of projection images of a patient's breast as an x-ray tube scans across a path over the breast. The set of projection images is subsequently reconstructed to a three-dimensional volume which may be viewed as slices or slabs along any plane. The three-dimensional volume may be stored locally at the x-ray imaging system 104 (either on the x-ray imaging device 114 or on the x-ray computing device 116) or at a data store such as the data store 112 in communication with the x-ray imaging system 104 through the communication network 152. In some examples, the three-dimensional volume is stored in a patient's file within an electronic medical record system 158. Additional details regarding an example x-ray imaging system are described in reference to FIGS. 3-5.

The x-ray imaging system 104 may transmit the three-dimensional x-ray image volume to a navigation system 156 via the communication network 152, where such x-ray images can be stored and viewed. The navigation system 156 displays the x-ray image obtained by the x-ray imaging system. Once reconstructed for display on navigation system 156 the x-ray image can be reformatted and repositioned to view the image at any plane and any slice position or orientation. In some examples, the navigation system 156 displays multiple frames or windows on the same screen showing alternative positions or orientations of the x-ray-image slice.

Skilled persons will understand that the x-ray image volume obtained by x-ray imaging system 104 can be transmitted to navigation system 156 at any point in time and is not necessarily transmitted immediately after obtaining the x-ray image volume, but instead can be transmitted on the request of navigation system 156. In alternative examples, the x-ray image volume is transmitted to navigation system 156 by a transportable media device, such as a flash drive, CD-ROM, diskette, or other such transportable media device.

The biopsy imaging system 106 can include one or more aspects of the x-ray imaging system 104. The biopsy imaging system 106 can visualize a lesion, derive target coordinates to navigate a biopsy needle to the lesion, verify the location, and excise tissue from the lesion. The biopsy imaging system 106 obtains and displays an x-ray image of a patient's anatomy. In some examples, the x-ray image is stored on a storage medium, such as a hard drive, CD-ROM, flash drive or diskette, for reconstruction or use at a later time. Additional details regarding an example biopsy imaging system are described in reference to FIGS. 6-7.

In some examples, the navigation system 156 can access the x-ray image obtained by the biopsy imaging system 106, and in such examples the biopsy imaging system 106 is further connected to the communication network 152 and a copy of the x-ray image obtained by the biopsy imaging system 106 is transmitted to the navigation system 156 via communication network 152. In other examples, the navigation system 156 remotely accesses and copies the x-ray image via the communication network 152. In addition or instead, a copy of the x-ray image is stored on the data store 112 or electronic medical record system 158 in communication with the navigation system 156 via the communication network 152 and accessed remotely by the navigation system 156.

The tracking system 154 is in communication with the navigation system 156 via the communications network 152 and may track the physical position in which the biopsy imaging system 106 is imaging the tissue of the patient. In some examples, the tracking system 154 can be connected directly to the navigation system 156 via a direct communication link or wireless communication link. The tracking system 154 tracks the position of transmitters connected to biopsy imaging system 106 and provides the navigation system 156 with data representing their coordinates in a tracker coordinate space. In some examples, the tracking system 154 may be an optical tracking system comprising an optical camera and optical transmitters, however skilled persons will understand that any device or system capable of tracking the position of an object in space can be used. For example, skilled persons will understand that in some examples a radio frequency (RF) tracking system can be used, comprising an RF receiver and RF transmitters.

The biopsy imaging system 106 may be configured for use with the navigation system 156 by a calibration process using the tracking system 154. Transmitters that are connected to the probe of biopsy imaging system 106 (e.g., a needle apparatus) may transmit their position to tracking system 154 in the tracker coordinate space, which in turn provides this information to navigation system 156. For example, transmitters may be positioned on the probe of the biopsy imaging system 106 so that the tracking system 154 can monitor the position and orientation of the probe and provide this information to the navigation system 156 in the tracker coordinate space. The navigation system 156 may use this tracked position to determine the position and orientation of the probe, relative to the tracked position of the transmitters.

In some examples, configuration occurs using a configuration tool. In such examples, the position and orientation of the configuration tool may be additionally tracked by tracking system 154. During configuration the configuration tool contacts the tip of the probe of the biopsy imaging system 106 and the tracking system 154 transmits information representing the position and orientation of the configuration tool in the tracker coordinate space to the navigation system 156. The navigation system 156 may determine a configuration matrix that can be used to determine the position and orientation of the field of view of the probe in the tracker coordinate space, based on the tracked position of the transmitters connected to the probe. In alternative examples, a database having configuration data of a plurality of brands or models of various probes can be used to pre-load a field of view configuration into the navigation system 156 during configuration.

Once the biopsy imaging system 106 is configured with the navigation system 156, the tissue of a patient can be imaged with biopsy imaging system 106. Since the biopsy imaging system 106 has been configured for use with the navigation system 156, the navigation system 156 is able to determine position and orientation of the field of view of the probe of the biopsy imaging system 106.

The navigation system 156 can be configured to co-register an initial image (e.g., from an initial imaging session, such as prior mammography session during which the lesion was initially identified) and a current image (e.g., a mammography image obtained during the current biopsy session). In some examples, the navigation system 156 can be configured to transform the position and orientation of the field of view of the biopsy imaging system 106 from the tracker coordinate space to a position and orientation in the initial image or vice versa. For example, a user can select an anatomical plane within the initial image, and the user can then manipulate the position and orientation of a tracked biopsy probe to align the field of view of the biopsy imaging system 106 with the selected anatomical plane. Once alignment is achieved, the associated tracker space coordinates of the current image can be captured. Registration of the anatomic axes (e.g., superior-inferior (SI), left-right (LR) and anterior-posterior (AP)) between the initial image and the tracker coordinate space can be determined from the relative rotational differences between the tracked field of view orientation and the selected anatomical plane using techniques known to those of skill in the art.

This configuration may further include the selection of landmarks within the initial image, for example, using an interface permitting a user to select an anatomical target. In some examples, the landmark can be an internal tissue landmark, such as veins or arteries, and in other examples, the landmark can be an external landmark, such as a fiducial skin marker or external landmark, such as a nipple. The same landmark selected in the initial image can be located with the probe, and upon location, a mechanism can be provided for capturing coordinates of the representation of the target in the tracker coordinate space. The relative differences between the coordinates of the target in the initial image and the coordinates of the target in the tracker coordinate space are used to determine the translational parameters required to align the two co-ordinate spaces. The plane orientation information acquired previously can be combined with the translation parameters to provide a complete 4×4 transformation matrix capable of co-registering the two coordinate spaces.

The navigation system 156 can then use the transformation matrix to reformat the initial image being displayed so that the slice of tissue being displayed is in the same plane and in the same orientation as the field of view of the biopsy probe of the biopsy imaging system 106. Matched initial and current images may then be displayed side by side, or directly overlaid in a single image viewing frame. In some examples, the navigation system 156 can display additional x-ray images in separate frames or positions on a display screen. For example, the x-ray image can be displayed with a graphical representation of the field of view of the biopsy imaging system 106 wherein the graphical representation of the field of view is shown slicing through a 3D representation of the x-ray image. In other examples annotations can be additionally displayed, these annotations representing, for example, the position of instruments imaged by the biopsy imaging system 106, such as biopsy needles, guidance wires, imaging probes or other similar devices.

In other examples, the current image being displayed by the biopsy imaging system 106 can be superimposed on the slice of the initial image being displayed by the navigation system 156 so that a user can view both the initial and current images simultaneously, overlaid on the same display. In some examples, the navigation system 156 can enhance certain aspects of the super imposed images to increase the quality of the resulting combined image.

As described in FIG. 1, the computing system 102 operating a lesion matching engine 110 analyzes sets of screening and biopsy images to determine a confidence level that a lesion identified in a biopsy image is the same lesion that was identified in the screening image. A confidence level indicator can be displayed on a computing device to aid a user operating the biopsy imaging system 106 in determining whether a previously identified lesion in a prior image has been found in a corresponding current image.

The electronic medical record system 158 stores a plurality of electronic medical records. Each electronic medical record contains the medical and treatment history of a patient. Examples of electronic medical records systems 158 include those developed and managed by EPIC SYSTEMS CORPORATION, CERNER CORPORATION, ALLSCRIPTS, AND MEDICAL INFORMATION TECHNOLOGY, INC. (MEDITECH).

Example X-Ray Imaging System

Figure 3:
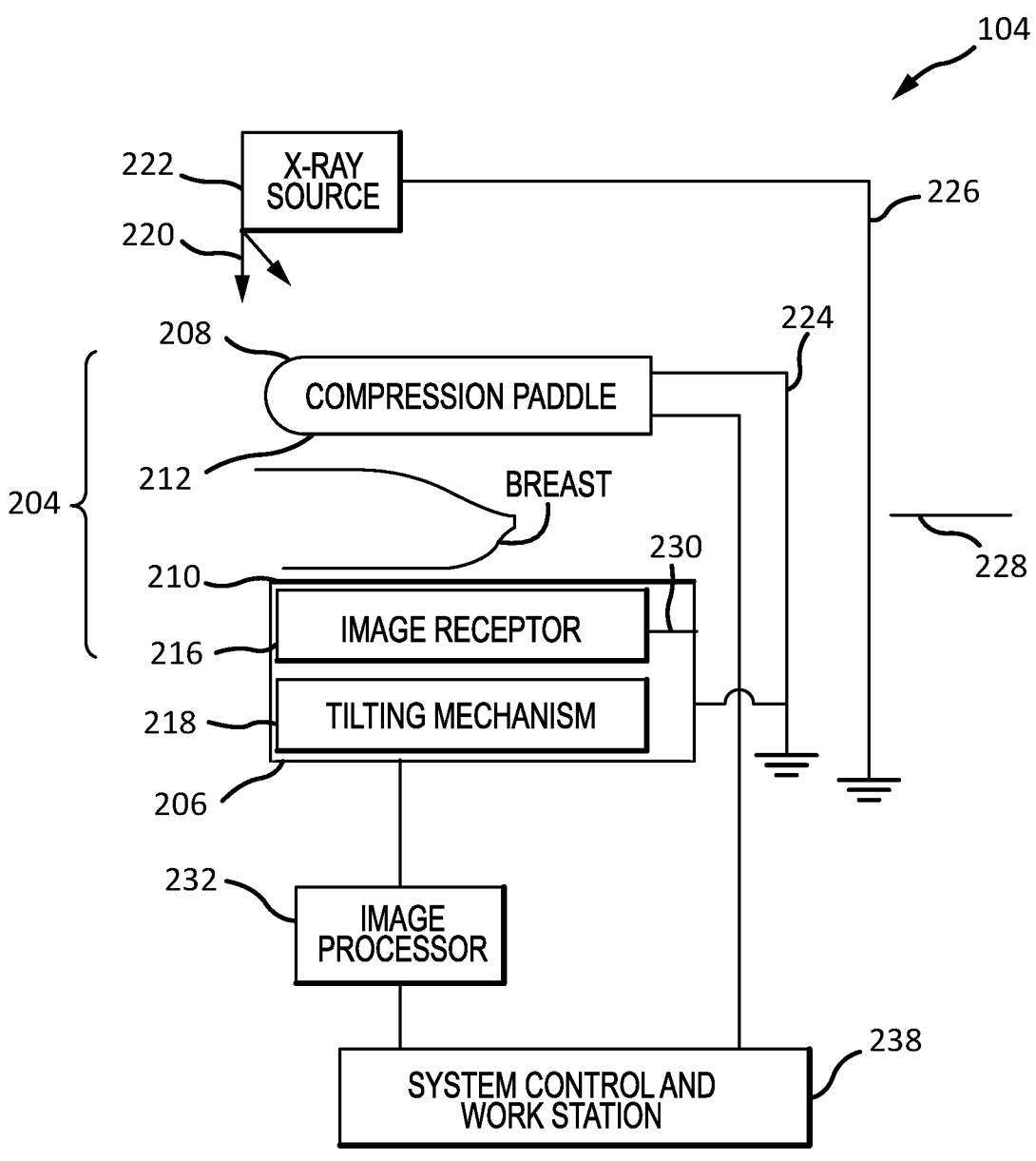
FIG. 3 is a schematic view of an example x-ray imaging system.
Figure 4:
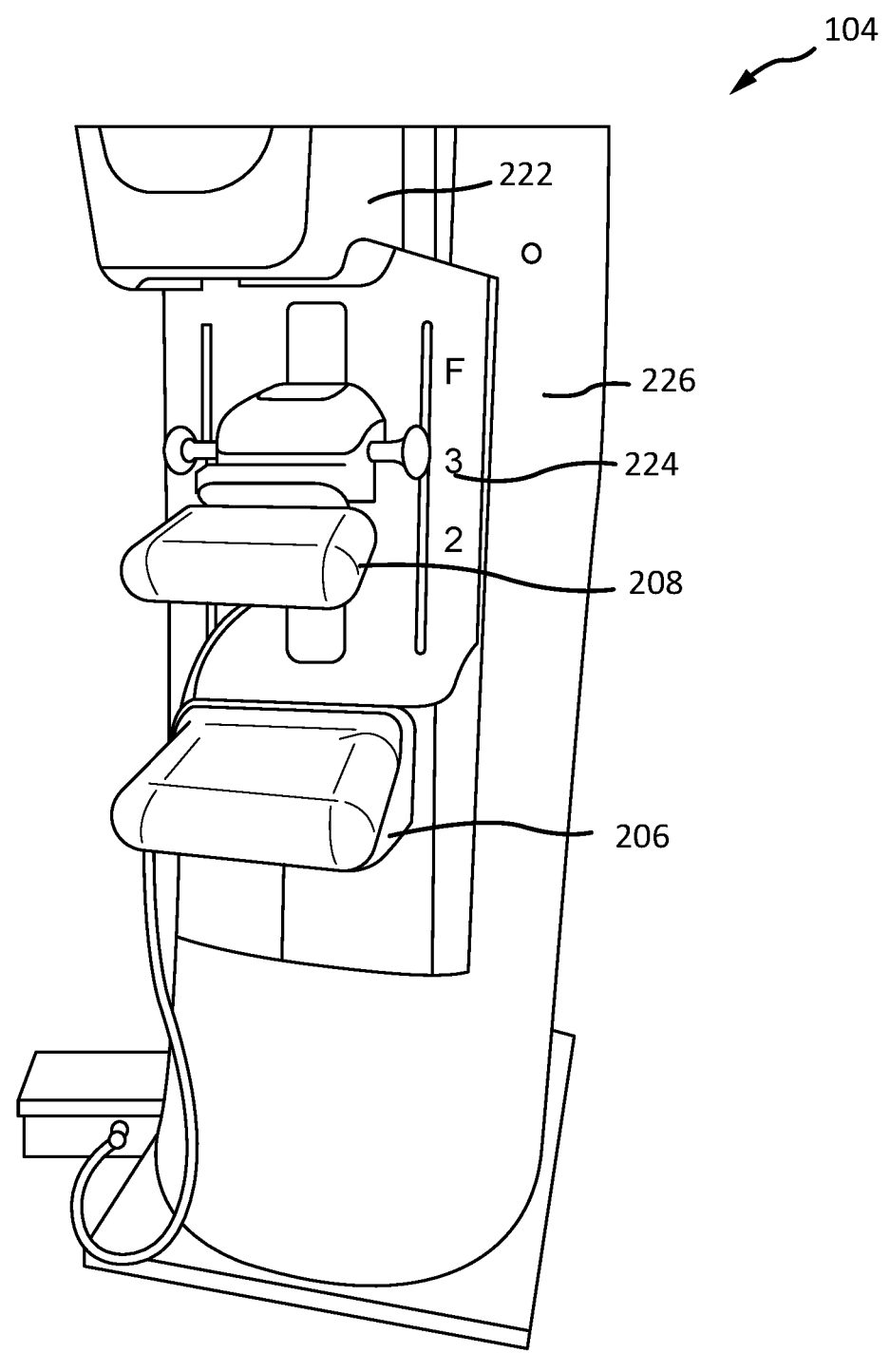
FIG. 4 is a perspective view of the x-ray imaging system of FIG. 3.

FIG. 3 is a schematic view of an example x-ray imaging system 104. FIG. 4 is a perspective view of the x-ray imaging system 104. Referring concurrently to FIGS. 3 and 4, the x-ray imaging system 104 immobilizes a patient's breast for x-ray imaging (e.g., either or both of mammography and tomosynthesis) via a breast compression immobilizer unit 204 that includes a static breast support platform 206 and a moveable compression paddle 208. The breast support platform 206 and the compression paddle 208 each have a compression surface 210 and 212, respectively, that move towards each other to compress and immobilize the breast. In known systems, the compression surface 210, 212 is exposed to directly contact the breast. The platform 206 also houses an image receptor 216 and, optionally, a tilting mechanism 218, and optionally an anti-scatter grid. The immobilizer unit 204 is in a path of an imaging beam 220 emanating from x-ray source 222, such that the beam 220 impinges on the image receptor 216.

The immobilizer unit 204 is supported on a first support arm 224 and the x-ray source 222 is supported on a second support arm 226. For mammography, support arms 224 and 226 can rotate as a unit about an axis 228 between different imaging orientations such as craniocaudal (CC) and mediolateral oblique (MLO), so that the system 104 can take a mammogram projection image at each orientation. In operation, the image receptor 216 remains in place relative to the platform 206 while an image is taken. The immobilizer unit 204 releases the breast for movement of arms 224, 226 to a different imaging orientation. For tomosynthesis, the support arm 224 stays in place, with the breast immobilized and remaining in place, while at least the second support arm 226 rotates the x-ray source 222 relative to the immobilizer unit 204 and the compressed breast about the axis 228. The system 104 takes plural tomosynthesis projection images of the breast at respective angles of the beam 220 relative to the breast.

Concurrently and optionally, the image receptor 216 may be tilted relative to the breast support platform 206 and in sync with the rotation of the second support arm 226. The tilting can be through the same angle as the rotation of the x-ray source 222, but may also be through a different angle selected such that the beam 220 remains substantially in the same position on the image receptor 216 for each of the plural images. The tilting can be about an axis 230, which can but need not be in the image plane of the image receptor 216. The tilting mechanism 218 that is coupled to the image receptor 216 can drive the image receptor 216 in a tilting motion.

For tomosynthesis imaging the breast support platform 206 can be horizontal or can be at an angle to the horizontal, e.g., at an orientation similar to that for conventional MLO imaging in mammography. The x-ray imaging system 104 can be solely a mammography system or solely a tomosynthesis system, or a "combo" system that can perform multiple forms of imaging. An example of such a combo system has been offered by the assignee hereof under the trade name SELENIA DIMENSIONS.

When the system is operated, the image receptor 216 produces imaging information in response to illumination by the imaging beam 220, and supplies it to an image processor 232 for processing and generating breast x-ray images. A system control and workstation unit 238 including software controls the operation of the system and interacts with the operator to receive commands and deliver information including processed-ray images.

Figure 5:
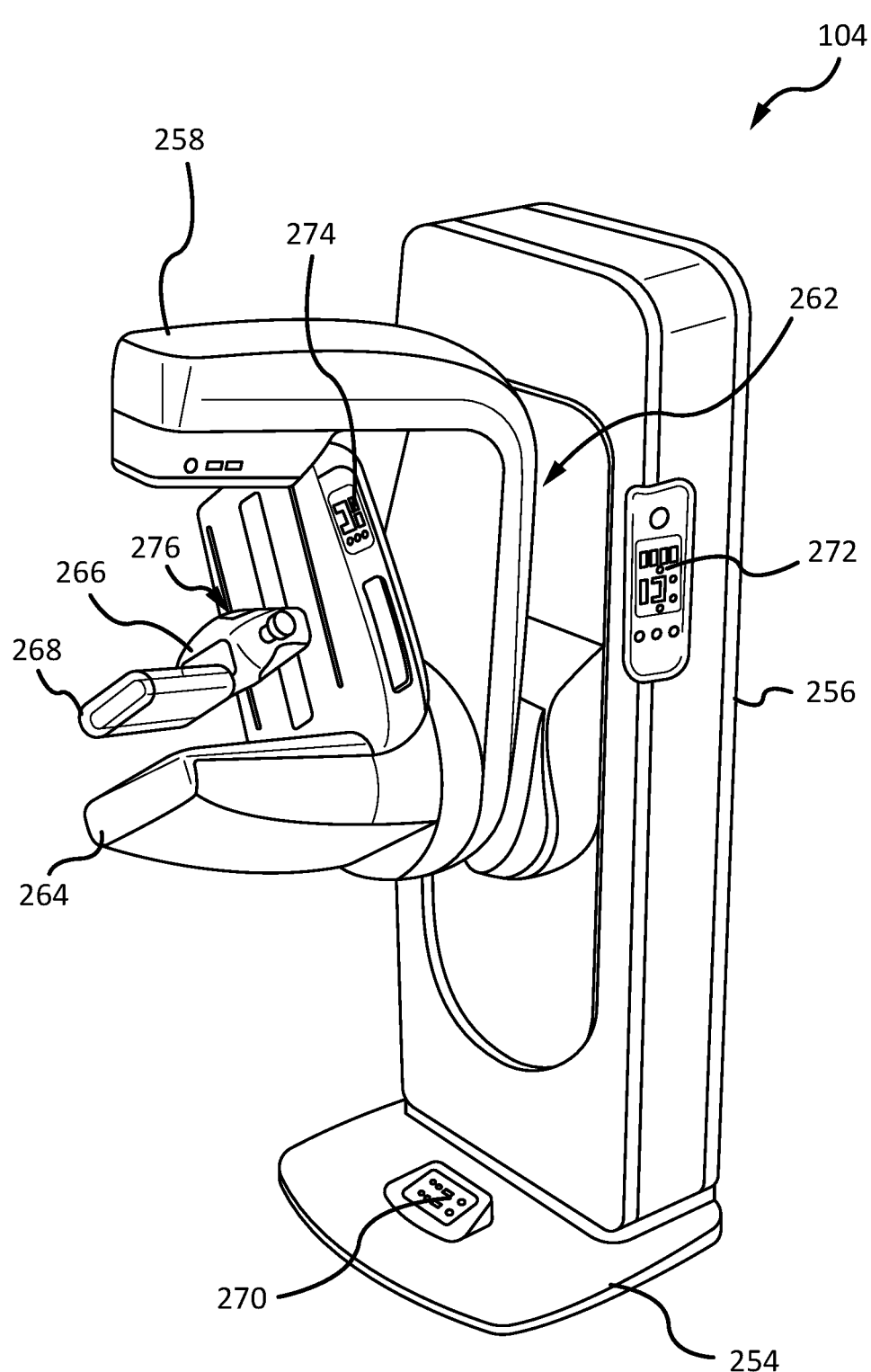
FIG. 5 depicts the x-ray imaging system in a breast positioning state for left mediolateral oblique imaging orientation.

FIG. 5 depicts an example x-ray imaging system 104 in a breast positioning state for left mediolateral oblique (LMLO) imaging orientation. A tube head 258 of the system 104 is set in an orientation so as to be generally parallel to a gantry 256 of the system 104, or otherwise not normal to the flat portion of a support arm 260 against which the breast is placed. In this position, the technologist may more easily position the breast without having to duck or crouch below the tube head 258.

The x-ray imaging system 104 includes a floor mount or base 254 for supporting the x-ray imaging system 104 on a floor. The gantry 256 extends upwards from the floor mount 252 and rotatably supports both the tube head 258 and a support arm 260. The tube head 258 and support arm 260 are configured to rotate discretely from each other and may also be raised and lowered along a face 262 of the gantry so as to accommodate patients of different heights. An x-ray source, described elsewhere herein and not shown here, is disposed within the tube head 258. The support arm 260 includes a support platform 264 that includes therein an x-ray receptor and other components (not shown). A compression arm 266 extends from the support arm 260 and is configured to raise and lower linearly (relative to the support arm 260) a compression paddle 268 for compression of a patient breast during imaging procedures. Together, the tube head 258 and support arm 260 may be referred to as a C-arm.

A number of interfaces and display screens are disposed on the x-ray imaging system 104. These include a foot display screen 270, a gantry interface 272, a support arm interface 274, and a compression arm interface 276. In general the various interfaces 272, 274, and 276 may include one or more tactile buttons, knobs, switches, as well as one or more display screens, including capacitive touch screens with graphic user interfaces (GUIs) so as to enable user interaction with and control of the x-ray imaging system 104. In examples, the interfaces 272, 274, 276 may include control functionality that may also be available on a system control and workstation, such as the x-ray computing device 116 of FIG. 1. Any individual interface 272, 274, 276 may include functionality available on other interfaces 272, 274, 276, either continually or selectively, based at least in part on predetermined settings, user preferences, or operational requirements. In general, and as described below; the foot display screen 270 is primarily a display screen, though a capacitive touch screen might be used if required or desired.

In examples, the gantry interface 272 may enable functionality such as: selection of the imaging orientation, display of patient information, adjustment of the support arm elevation or support arm angles (tilt or rotation), safety features, etc. In examples, the support arm interface 274 may enable functionality such as adjustment of the support arm elevation or support arm angles (tilt or rotation), adjustment of the compression arm elevation, safety features, etc. In examples, the compression arm interface 276 may enable functionality such as adjustment of the compression arm elevation, safety features, etc. Further, one or more displays associated with the compression arm interface 276 may display more detailed information such as compression arm force applied, imaging orientation selected, patient information, support arm elevation or angle settings, etc. The foot display screen 270 may also display information such as displayed by the display(s) of the compression arm interface 276, or additional or different information, as required or desired for a particular application.

Example Biopsy System

As described above, disclosed examples can be used with any of a variety of biopsy imaging systems. One example implementation is a station for tomotactic-guided biopsy in prone as described in US 2020/0093562, which is hereby incorporated herein by reference in its entirety for any and all purposes. That example includes a table with an aperture, a tomosynthesis imaging system, and a biopsy gun mounted on a stage arm assembly disposed below the table. Another example implementation of a biopsy imaging system is a tilted needle biopsy assembly is provided for mounting on an x-ray system, such as is described below in FIGS. 6 and

7. Further details regarding this example biopsy imaging system are found in US 2020/0205928, which is hereby incorporated by reference in its entirety for any and all purposes.

Figure 6:
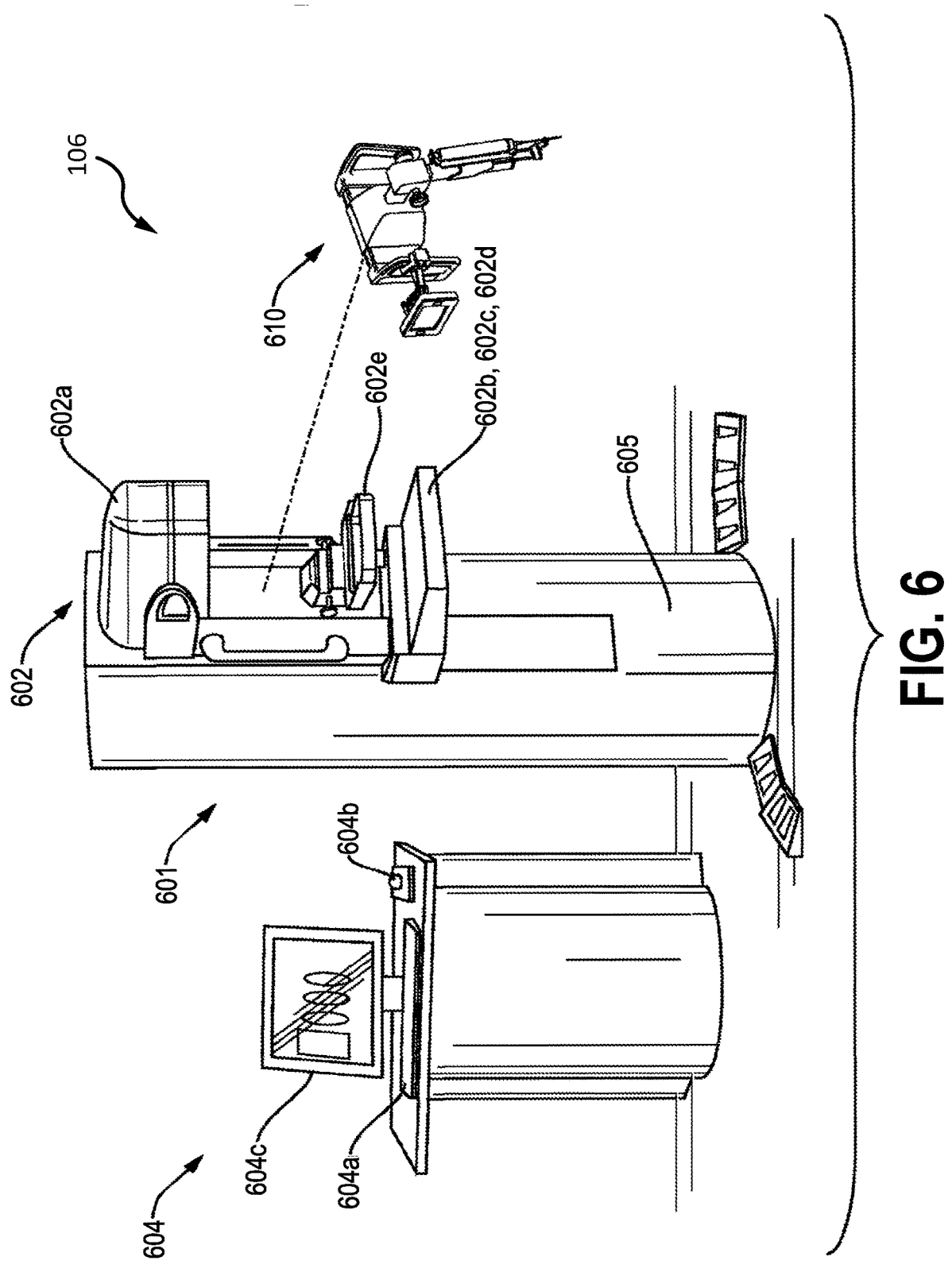
FIG. 6 illustrates an example illustrates a biopsy system with x-ray mammography/tomosynthesis imaging capabilities and a needle biopsy assembly.

FIG. 6 illustrates a biopsy system 106 with x-ray mammography/tomosynthesis imaging capabilities that may benefit from technologies disclosed herein. The system 106 is shown to include an acquisition workstation (AWS) 604 and gantry 601 supporting an x-ray imaging assembly 602. Such a mammography/tomosynthesis system is currently available from the applicant under the trade name SELENIA DIMENSIONS, and is representative of merely one x-ray system on which a needle biopsy assembly 610 may be mounted. The gantry 601 supports a C-arm that can move up or down along the gantry to a selected height, driven by motor(s) controlled by a health professional operating the system. C-arm carries an x-ray tube 602a at an upper end and a breast tray 602b at a lower end. Tray 602b covers a flat panel x-ray image receptor 602c, spaced from the tray by a focused anti-scatter grid 602d (which may be retractable so that it can be removed from the space between tray 602b and receptor 602c). The C-arm also carries a compression paddle 602e that is between source 602a and breast tray 602b and is motorized to move away from tray 602b so a patient's breast can fit between tray 602b and paddle 602e, and closer to tray 602b so the patient's breast can be compressed and immobilized. The movement of paddle 602e is motorized and controlled by the health professional. Paddles 602e of different size and different configurations can be fitted on the gantry to suit different breast sizes or to suit imaging needs (i.e., for screening or diagnosis). In addition, the health professional can move paddle 602e along the width of tray 602b to a position in which paddle 602e matches the position of a breast that is not centered on tray 602b, as in the SELENIA system currently offered by the common assignee. The system further includes other components, such as a control station 604 comprising interface devices such a keyboard 604a and trackball 604b, a display screen 604c, and control and image processing facilities. According to one aspect of the invention a needle biopsy assembly 610 may easily be mounted in between the x-ray source and the x-ray detector of the imaging system 602. The needle biopsy assembly 610 can use the existing components of the x-ray system, including the compression device and the x-ray detector.

Figure 7:
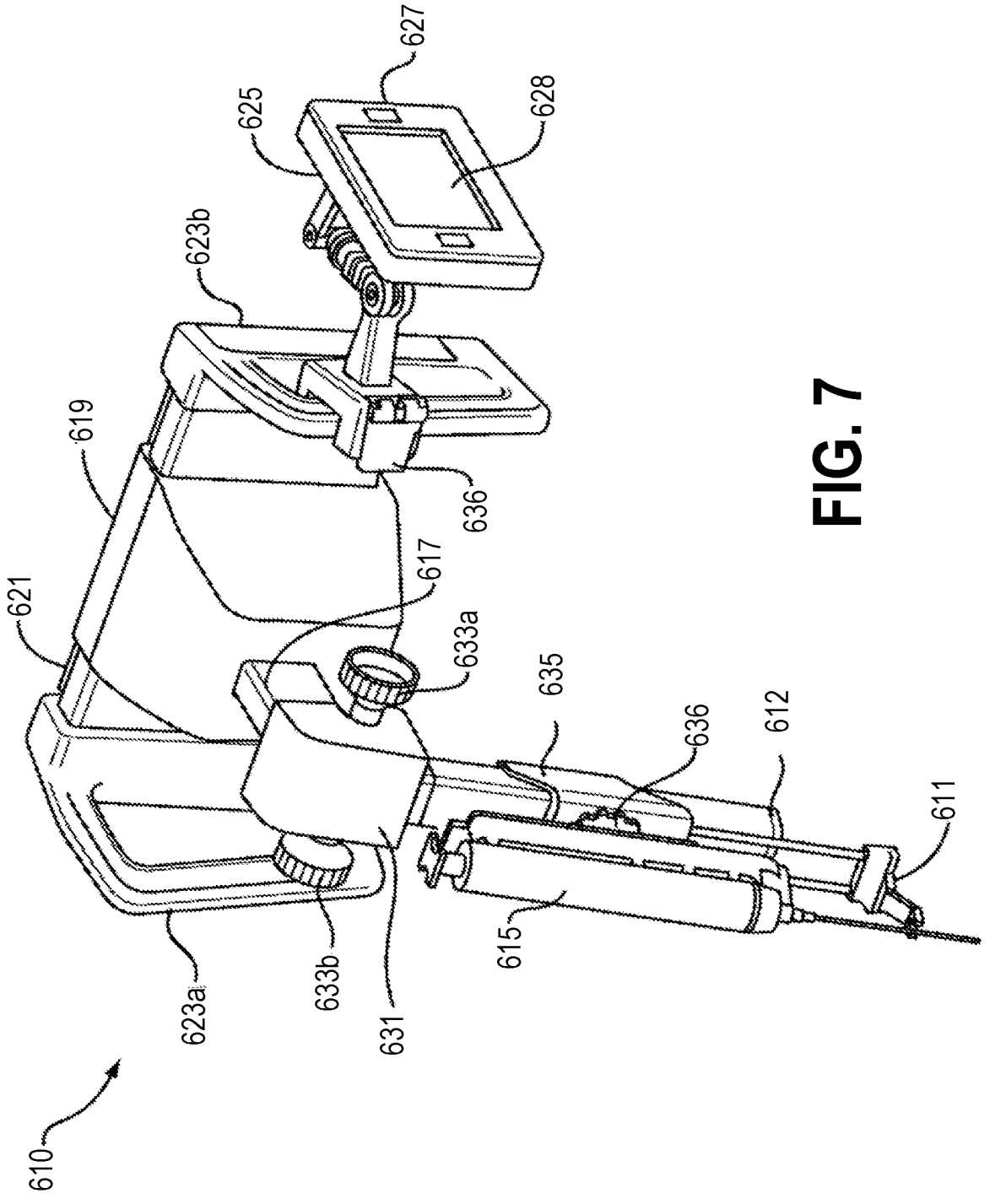
FIG. 7 depicts the needle biopsy assembly of FIG. 6 in more detail.

FIG. 7 illustrates the needle biopsy assembly 610 in more detail. Support bracket 621 extends between handles 623a and 623b, which facilitate transport of the assembly. Guidance module 619, mounted on support bracket 621, includes components for controlling the movement of the biopsy device 615. The biopsy device may be, for example, an EVIVA vacuum assisted biopsy device manufactured and sold by applicant. Fixed support arm 617 extends from the guidance module to connector 631. In one embodiment connector 631 connects angular support arm 612 to the fixed support arm 617 at a fixed angle. Alternative embodiments which include adjustment mechanisms for varying the angle of displacement between the angular support arm and the fixed support arm may be substituted herein as equivalents. Holster mount 635 is moveably coupled to the support arm. The linear movement may be mechanically controlled (i.e., via the guidance module and associated motors) and/or may be manually controlled using either or both of the thumbwheel knobs 633a and 633b. The holster mount 635 includes an attachment mechanism 636 that is adapted to receive biopsy holster 613. The biopsy device 615 sits within the biopsy holster 613. A needle support 611 may advantageously be coupled to the holster mount for needle stabilization. A control module 625 may be mounted to either of the handles, 623b or 623a via clamp 636. In various embodiments, each handle may include one or more electrical connectors which enable communication between the clamped control module 625 and the guidance module 619, and the medical professional may move the control module to either handle as a matter of preference. The control module 625 includes a user interface that enables a medical professional to control the biopsy procedure without the need to leave the patient. The control module includes a display 628 for displaying a status or other information about the biopsy, and one or more buttons 627 for controlling the movement of the biopsy device during the procedure.

Example Computing Device

Figure 8:
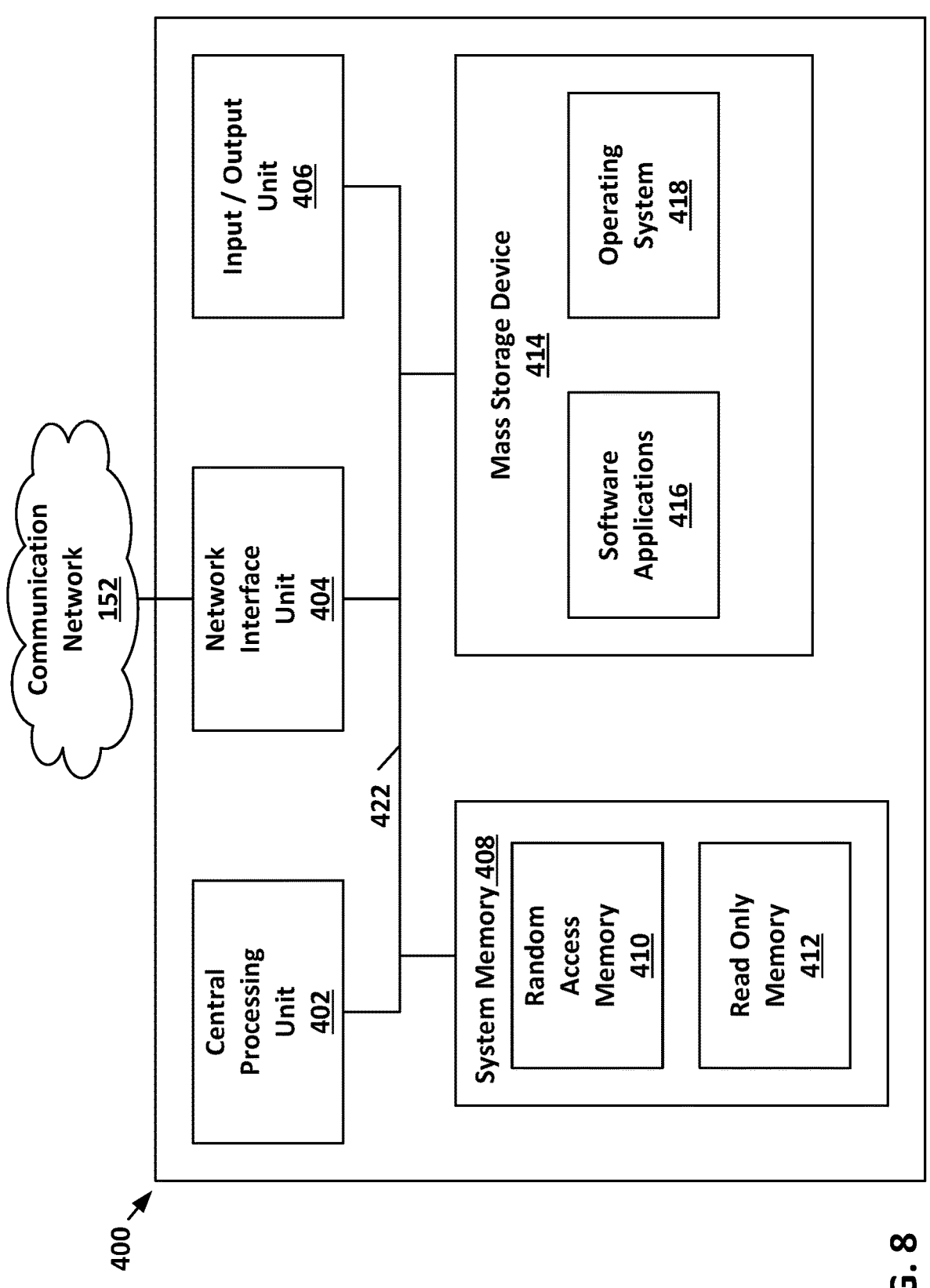
FIG. 8 is a schematic diagram of an exemplary computing system usable to implement one or more aspects of the present disclosure.

FIG. 8 is a block diagram illustrating an example of the physical components of a computing device 400. The computing device 400 can be any computing device used in conjunction with the lesion identification system 100 or the system 150 for managing imaging data such as the computing system 102, x-ray computing device 116, and biopsy computing device 118.

In the example shown in FIG. 8, the computing device 400 includes at least one central processing unit ("CPU") 402, a system memory 408, and a system bus 422 that couples the system memory 408 to the CPU 402. The system memory 408 includes a random-access memory ("RAM") 410 and a read-only memory ("ROM") 412. A basic input/output system that contains the basic routines that help to transfer information between elements within the computing device 400, such as during startup, is stored in the ROM 412. The computing system 400 further includes a mass storage device 414. The mass storage device 414 can store software instructions and data.

The mass storage device 414 is connected to the CPU 402 through a mass storage controller (not shown) connected to the system bus 422. The mass storage device 414 and its associated computer-readable storage media provide non-volatile, non-transitory data storage for the computing device 400. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 402 can read data and/or instructions. In certain examples, the computer-readable storage media includes entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology. CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 400.

According to some examples, the computing device 400 can operate in a networked environment using logical connections to remote network devices through a network 152, such as a wireless network, the Internet, or another type of network. The computing device 400 may connect to the network 152 through a network interface unit 404 connected to the system bus 422. It should be appreciated that the network interface unit 404 may also be used to connect to other types of networks and remote computing systems. The computing device 400 also includes an input/output controller 406 for receiving and processing input from a number of other devices, including a touch user interface display screen, or another type of input device. Similarly, the input/output controller 406 may provide output to a touch user interface display screen or other type of output device.

As mentioned briefly above, the mass storage device 414 and the RAM 410 of the computing device 400 can store software instructions and data. The software instructions include an operating system 418 suitable for controlling the operation of the computing device 400. The mass storage device 414 and/or the RAM 410 also store software instructions, that when executed by the CPU 402, cause the computing device 400 to provide the functionality discussed in this document.

Example Method

Referring now to FIG. 9, an example method 500 of locating a region of interest within a breast is described. In some examples, the systems and devices described in FIGS. 1-8 are usable to implement the method 500. In particular, the computing system 102 of FIGS. 1-2 operates to implement the steps of the method 500 to aid a healthcare provider in locating a region of interest within a breast during an imaging procedure.

At operation 502, a first image obtained by an imaging modality (e.g., x-ray imaging) is received. In some examples, the x-ray imaging device 114 of the x-ray imaging system 104 of FIGS. 1-2 operates to record the first image as the result of inputs provided by a healthcare provider at an x-ray computing device 116. In some examples, the first image is acquired using digital breast tomosynthesis. In other examples, the first image that is acquired is a digital mammography image. In some examples, the first image is obtained from a remote data store. In such examples, the first image may have been recorded at a different time and place and then stored in an electronic medical record or other data store. In some examples, the first image is received at the computing system 102. In some examples, the first image is obtained during an initial imaging session. The initial imaging session can be a regular screening imaging session. In other examples, the initial imaging session can be a diagnostic imaging session to provide diagnostic information reading a region of interest (e.g., as may be discovered during a screening). In an example, the first image can be a two-dimensional image or a three-dimensional image.

At operation 504, an indication of a target lesion on the first image is received. In some examples, the indication is received from the healthcare provider at the x-ray computing device 116. The computing device 116 may operate to display a user interface that allows the healthcare provider to easily interact with images to highlight a target lesion using inputs provided with an input device in communication with the x-ray computing device 116 such as a mouse, a touch-screen, or a stylus. In some examples, the target lesion can be indicated with a visual marker. The target lesion is identified by the healthcare provider as requiring additional analysis. In some examples, the target lesion is later identified by a clinician after the first image is taken. In some examples, target lesions can be identified in real-time as the first image is being recorded using an artificial intelligence system.

At operation 506, location coordinates of the target lesion are recorded. For example, coordinates of the target lesion can be recorded during the imaging process using the x-ray imaging system 104. In some examples, the coordinates can be Cartesian coordinates or polar coordinates. In some examples, a region of interest may be identified within a particular slice within a tomosynthesis image stack (z coordinate) and its position can be further identified by x and y coordinates within that image slice.

At operation 508, a second image of the breast tissue is obtained by an imaging modality (e.g., an x-ray imaging modality) during a biopsy session (e.g., a biopsy procedure). The imaging modality used to obtain the second image can be the same imaging modality used to obtain the first image. The biopsy session can be more recent in time than the session during which the first image was obtained. As such, the biopsy session can be a current session and the earlier session can be referred to as an initial session. The second image includes an area of the breast tissue corresponding to the location coordinates of the target lesion. In some examples, the biopsy imaging device 120 of the biopsy imaging system 106 of FIGS. 1-2 and 6-7 operates to record the second image as the result of inputs provided by a healthcare provider at a biopsy computing device 118. In some examples, the second image is obtained from a remote data store. In such examples, the second image is recorded at a different time and place and then stored in an electronic medical record or other data store. In some examples, the second image is received at the computing system 102 for processing with the first image.

At operation 510, a potential lesion is identified in the second image within the area of the breast tissue corresponding to the location coordinates of the target lesion. In some examples, the area is identified based on coordinates that were converted from the coordinates saved for the target lesion during imaging that produced the first image. In some examples, the location coordinates include at least two of: (1) a clock position relative to the nipple, (2) a depth from the surface of the breast, and (2) a distance from the nipple. In some examples, the potential lesion is highlighted by a healthcare provider at the biopsy computing device 118. The computing device 118 may operate to display a user interface that allows the healthcare provider to easily interact with biopsy images to highlight a potential lesion by means of inputs provided with an input device in communication with the biopsy computing device 118 such as a mouse, a touchscreen, or a stylus. In some embodiments, a GUI 130 displays the first image and the second image side by side. An example of this GUI 130 is shown in FIG. 10. The potential lesion is identified by the healthcare provider as potentially being the same as the target lesion identified in the first image. In some examples, a real-time artificial intelligence system analyzes digital breast tomosynthesis images as they are recorded to identify potential lesions. One example of such a system is described in U.S. Patent Application No. 62/979,851, which is entitled "Real-time AI for Physical Biopsy Marker Detection", and which is hereby incorporated herein by reference in its entirety for any and all purposes.

At operation 512, the potential lesion is analyzed using artificial intelligence to determine a level of confidence that the potential lesion in the second image corresponds to the target lesion in the first image. In some examples, the lesion matching engine 110 operates to analyze the potential lesion and target lesion to determine if the two lesions match. As is described above, a machine learning lesion classifier analyzes various aspects of the lesions such as size, shape, and texture to match initial (e.g., screening) and current (biopsy) images of lesions. In some examples, stiffness and density can also be compared to determine a match.

In an example, both the first image and the second image (or representations thereof, such as extracted features of each) are provided as input to one or more artificial intelligence units 124. The one or more artificial intelligence units 124 provide, as output, an indication of whether the first and second images match, such as matching because they both show the same lesion. Alternatively, the indication can be expressed as a confidence that a potential lesion shown in the second image matches the identified lesion in the first image.

At operation 514, an indicator of the level of confidence is output. For example, the level of confidence is obtained as output from the one or more artificial intelligence units 124. In some examples, the level of confidence is the level of confidence that the lesion in the initial image is the same lesion as the lesion in the current image. In some examples, a confidence level indicator is generated on the GUI 130, thereby outputting the indicator of the level of confidence. In some examples, the GUI 130 includes initial and current images along with the confidence level indicator. In some examples, the indicator is displayed as text, graphics, colors, symbols, other indications, or combinations thereof. More details regarding an example of the GUI 130 are provided in FIG. 10.

In some examples, following operation 514, a biopsy procedure is preformed.

User Interface

FIG. 10 shows an example of the GUI 130. In some examples, the GUI 130 is displayed on a computing device such as the biopsy computing device 118 of FIG. 1. In the example of FIG. 10, the GUI 130 displays an initial image 1010, a current image 1020, and a match confidence indicator 1030. The match confidence indicator 1030 is displayed providing the likelihood, as a percentage, that the target lesion and potential lesion are a match. In this example, there is a 97.9% match confidence.

The GUI 130 further includes menus and/or control buttons or icons which enable the radiologist to control the display and output of information gathered during the biopsy. Targeting tools 1110 allow the user to review, modify and delete target information. Image source selectors 1120 (including stereotactic, tomosynthesis, scout, mammography, etc.) allow the radiologist to select which images to use for visualization or targeting. Image view selectors 1130 allow the radiologist to quickly pull up and view any of the images that may have been acquired during the biopsy. Any of the images may be pulled up in the image window 1150. Other information related to the biopsy (e.g., the type of biopsy device, the relative distances between the target and the compression plate/platform, other information, or combinations thereof) can also be included on the acquisition workstation. While a particular arrangement of buttons and icons is shown in the example GUI 130 of FIG. 10, the present invention is not limited to any particular representation of such information, and other arrangements are considered equivalents hereto. Different arrangements can include, for example, various layouts of components such as pull-down menus, links, icons, buttons, and windows.

In some examples, other indicators of the confidence level are provided such as a colored circle around the potential lesion in the current image 1020. For instance, different colors of the colored circle represent different levels of confidence: a high level of confidence is indicated with a green circle, a medium level of confidence is indicated with a yellow circle, and a low level of confidence is indicated with a red circle. In some examples, both a visual indicator and a text confidence level indicator 1030 are used.

The methods and systems described herein provide navigation and lesion matching technology that helps healthcare professionals to quickly and accurately locate lesions during a biopsy session. The system enables a healthcare professional to identify a region of interest during initial imaging using a first modality (e.g., mammography). During subsequent imaging (e.g., using the same modality) performed during a biopsy session, the initial image, target region of interest, and a current image are displayed simultaneously. This guides the professional to the region of interest while simultaneously automating documentation of the probe's position, orientation, and annotations. Once the professional has navigated to the region of interest, the system automatically analyzes the images, matches the lesion, and provides a visual confidence indicator.

The systems and methods provided herein allow a healthcare professional to navigate within a particular distance (e.g., 1 cm) of a target lesion. The artificial intelligence system is built on, for example, thousands of confirmed cases. Lesions can be matched with greater accuracy than healthcare professionals can accomplish on their own.

Although various embodiments and examples are described herein, those of ordinary skill in the art will understand that many modifications may be made thereto within the scope of the present disclosure. Accordingly, it is not intended that the scope of the disclosure in any way be limited by the examples provided.

What is claimed is:

1. A method of locating of a lesion within a breast, the method comprising:

receiving, at a computing device, an initial image of a target lesion within the breast, wherein the initial image was generated during an initial imaging session;

receiving, at the computing device, a current image of the breast obtained during a current biopsy session;

receiving, at the computing device, an indication of a location of a potential lesion in the current image;

analyzing, with a machine learning lesion classifier, the potential lesion to compare the potential lesion to the target lesion and determine a level of confidence that the potential lesion corresponds to the target lesion, wherein the machine learning lesion classifier analyzes lesions for correlations in one or more of density, stiffness, shape, size, and texture;

outputting an indicator of the level of confidence for display on a graphical user interface of a biopsy computing device; and based at least partially on the level of confidence, navigating a biopsy device, via the biopsy computing device, to the potential lesion during the current biopsy session.

2. The method of claim 1, further comprising:

performing a biopsy on the potential lesion.

3. The method of claim 1, further comprising:

recording location coordinates of the target lesion; and recording location coordinates of the potential lesion, wherein analyzing the potential lesion comprises comparing location coordinates of the target lesion and location coordinates of the potential lesion.

4. The method of claim 3, wherein the location coordinates of the potential lesion comprise a clock position relative to a nipple of the breast, a depth from a surface of the breast, and a distance from the nipple.

5. The method of claim 1, wherein the initial image and the current image are two-dimensional images or are obtained using digital breast tomosynthesis.

6. The method of claim 1, further comprising providing the initial image and the current image as input to the machine learning lesion classifier.

7. The method of claim 1, wherein analyzing the potential lesion is performed using an artificial intelligence system trained using a library of digital breast tomosynthesis images.

8. The method of claim 7, wherein the artificial intelligence system is an unsupervised machine learning system.

9. The method of claim 1, wherein analyzing the potential lesion comprises comparing form factors of the target lesion and the potential lesion.

10. The method of claim 1, wherein the indicator comprises displaying at least one of a shape, a color, a numerical value, or a reference on the received image.

11. A lesion identification system comprising:

a processing device; and a memory storing instructions that, when executed by the processing device, facilitate performance of operations, comprising:

accessing an initial x-ray image of a breast, the initial x-ray image including an identified lesion indicated with a visual marker;

receiving a current x-ray image of the breast, the current x-ray image including an indication of a potential lesion, wherein the current x-ray image is obtained during a current biopsy session;

analyzing the potential lesion and the identified lesion using an artificial intelligence lesion classifier, wherein the artificial intelligence lesion classifier is trained on digital breast tomosynthesis images, and wherein the artificial intelligence lesion classifier analyzes lesions for correlations in one or more of density, stiffness, shape, margins, orientation, texture, pattern, size, and depth within the breast;

generating a confidence score indicating a likelihood that the potential lesion in the current x-ray image matches the identified lesion in the initial x-ray image;

displaying an output associated with the confidence score on a graphical user interface; and based at least partially on the confidence score, navigating a biopsy device, via the graphical user interface, towards the potential lesion during the current biopsy session.

12. The system of claim 11, wherein the operations further comprise accessing a first set of coordinates identifying a location of the identified lesion while the breast is under compression; translating the first set of coordinates into a second set of coordinates identifying a predicted location of the identified lesion while the breast is not under compression; identifying a region of interest in the current x-ray image corresponding to the second set of coordinates; and identifying the potential lesion in the current x-ray image.

13. The system of claim 11, wherein the artificial intelligence lesion classifier is trained on two-dimensional images.

14. The system of claim 11, wherein the artificial intelligence lesion classifier uses an unsupervised machine learning system.

15. The system of claim 11, wherein the initial x-ray image was generated during a screening session.

16. The system of claim 11, wherein the current x-ray image is received from an x-ray system and the confidence score is communicated to a display in communication with the x-ray system.

17. The system of claim 16, wherein a visual indication of the confidence score is displayed on the display in communication with the x-ray system as a visual indicator on the current x-ray image.

18. A non-transitory machine-readable storage medium, comprising executable instructions that, when executed by a processor, facilitate performance of operations, comprising:

obtaining data for a target lesion from a data store, wherein the data was obtained with x-ray imaging and includes at least an initial image of the target lesion and coordinates for a location of the target lesion within a breast;

recording a current image of the breast obtained by x-ray imaging during a current biopsy session;

identifying a general area of interest in the current image of the breast based on the coordinates of the target lesion;

identifying a potential lesion in the general area of interest;

analyzing, using an artificial intelligence lesion classifier, the potential lesion to compare the potential lesion to the target lesion and determine a level of confidence that the potential lesion corresponds to the target lesion, wherein the artificial intelligence lesion classifier analyzes lesions for correlations in one or more of density, stiffness, shape, size, and texture;

outputting an indicator of the level of confidence on a graphical user interface; and based at least partially on the level of confidence, navigating a biopsy device, via the graphical user interface, towards the potential lesion during the current biopsy session.

19. The non-transitory machine-readable storage medium of claim 18, wherein the operations further comprise:

recording the initial image using digital breast tomosynthesis;

receiving an indication on the initial image of the target lesion within the breast;

determining coordinates for a location of the target lesion; and saving the indication and coordinates of the target lesion in the data store.

20. A lesion identification system comprising:

a processing device; and a memory storing instructions that, when executed by the processing device, facilitate performance of operations, comprising:

accessing an initial x-ray image of a breast, the initial x-ray image including an identified lesion indicated with a visual marker;

accessing a first set of coordinates identifying a location of the identified lesion while the breast is under compression;

translating the first set of coordinates into a second set of coordinates and identifying a predicted location of the identified lesion while the breast is not under compression;

receiving a current x-ray image of the breast, the current x-ray image including an indication of a potential lesion;

identifying a region of interest in the current x-ray image corresponding to the second set of coordinates;

identifying the potential lesion in the current x-ray image;

analyzing the potential lesion and the identified lesion using an artificial intelligence lesion classifier;

generating a confidence score indicating a likelihood that the potential lesion in the current x-ray image matches the identified lesion in the initial x-ray image;

displaying an output associated with the confidence score on a graphical user interface; and based at least partially on the confidence score, navigating a biopsy device, via the graphical user interface, towards the potential lesion.

* * * * *